(12) United States Patent
Radtke

(10) Patent No.: US 11,877,533 B2
(45) Date of Patent: Jan. 23, 2024

(54) SEED DELIVERY APPARATUS, SYSTEMS, AND METHODS

(71) Applicant: Precision Planting LLC, Tremont, IL (US)

(72) Inventor: Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 274 days.

(21) Appl. No.: 17/344,193

(22) Filed: Jun. 10, 2021

(65) Prior Publication Data

US 2021/0298225 A1 Sep. 30, 2021

Related U.S. Application Data

(63) Continuation of application No. 16/459,153, filed on Jul. 1, 2019, now Pat. No. 11,058,048, which is a continuation of application No. 15/714,697, filed on Sep. 25, 2017, now Pat. No. 10,398,077, which is a continuation of application No. 14/915,530, filed as application No. PCT/US2014/053554 on Aug. 29, 2014, now Pat. No. 9,769,978.

(60) Provisional application No. 61/923,449, filed on Jan. 3, 2014, provisional application No. 61/872,319, filed on Aug. 30, 2013.

(51) Int. Cl.
| | |
|---|---|
| A01C 7/10 | (2006.01) |
| A01C 7/04 | (2006.01) |
| A01C 7/20 | (2006.01) |
| A01C 7/08 | (2006.01) |
| A01C 7/16 | (2006.01) |

(52) U.S. Cl.
CPC .............. A01C 7/105 (2013.01); A01C 7/046 (2013.01); A01C 7/081 (2013.01); A01C 7/16 (2013.01); A01C 7/20 (2013.01); A01C 7/205 (2013.01); A01C 7/206 (2013.01)

(58) Field of Classification Search
CPC ......... A01C 7/105; A01C 7/046; A01C 7/081; A01C 7/16; A01C 7/20; A01C 7/205; A01C 7/206; A01C 7/102; A01C 7/10; A01C 7/08; A01C 7/00; A01C 7/044; A01C 7/042; A01C 7/04; A01C 7/201
See application file for complete search history.

(56) References Cited

U.S. PATENT DOCUMENTS

| | | | |
|---|---|---|---|
| 9,769,978 B2 * | 9/2017 | Radtke | A01C 7/16 |
| 10,398,077 B2 * | 9/2019 | Radtke | A01C 7/205 |
| 11,058,048 B2 * | 7/2021 | Radtke | A01C 7/206 |

FOREIGN PATENT DOCUMENTS

| | | | | |
|---|---|---|---|---|
| EP | 2213152 A1 * | 8/2010 | | A01C 21/00 |
| WO | WO-2013049198 A1 * | 4/2013 | | A01C 19/02 |

* cited by examiner

*Primary Examiner* — Christopher J. Novosad

(57) ABSTRACT

An apparatus and methods for delivering seed from a metering device to a furrow. In one embodiment, a seed meter entrains seeds on a seed disc rotating toward a seed release location. A guide brush assembly guides the entrained seeds toward the seed release location, whereupon the entrained seeds are released from the seed disc into an upper end of a seed conveyor. The seed conveyor conveys the seed toward the soil and releases the seed with a rearward relative velocity.

17 Claims, 23 Drawing Sheets

SEED DELIVERY APPARATUS, SYSTEMS, AND METHODS

CROSS REFERENCE TO RELATED APPLICATIONS

This application is a continuation of U.S. Ser. No. 16/459,153, filed 1 Jul. 2019; which is a continuation of U.S. Ser. No. 15/714,697, filed 25 Sep. 2017, now U.S. Pat. No. 10,398,077; which is a continuation of U.S. Ser. No. 14/915,530, filed 29 Feb. 2016, now U.S. Pat. No. 9,769,978; which is a national stage entry of PCT/2014/053554, filed on 29 Aug. 2014, which claims priority to U.S. Provisional Application No. 61/923,449, filed on 3 Jan. 2014, and 61/872,319, filed on 30 Aug. 2013, all of which are incorporated herein by reference in their entireties.

BACKGROUND

In recent years, the agricultural industry has recognized the need to perform planting operations more quickly due to the limited time during which such planting operations are agronomically preferable or (in some growing seasons) even possible due to inclement weather. However, drawing a planting implement through the field at faster speeds increases the speed of deposited seeds relative to the ground, causing seeds to roll and bounce upon landing in the trench and resulting in inconsistent plant spacing. The adverse agronomic effects of poor seed placement and inconsistent plant spacing are well known in the art.

As such, there is a need for apparatus, systems and methods of effectively delivering seed to the trench while maintaining seed placement accuracy at both low and high implement speeds.

DESCRIPTION

Figure 1:
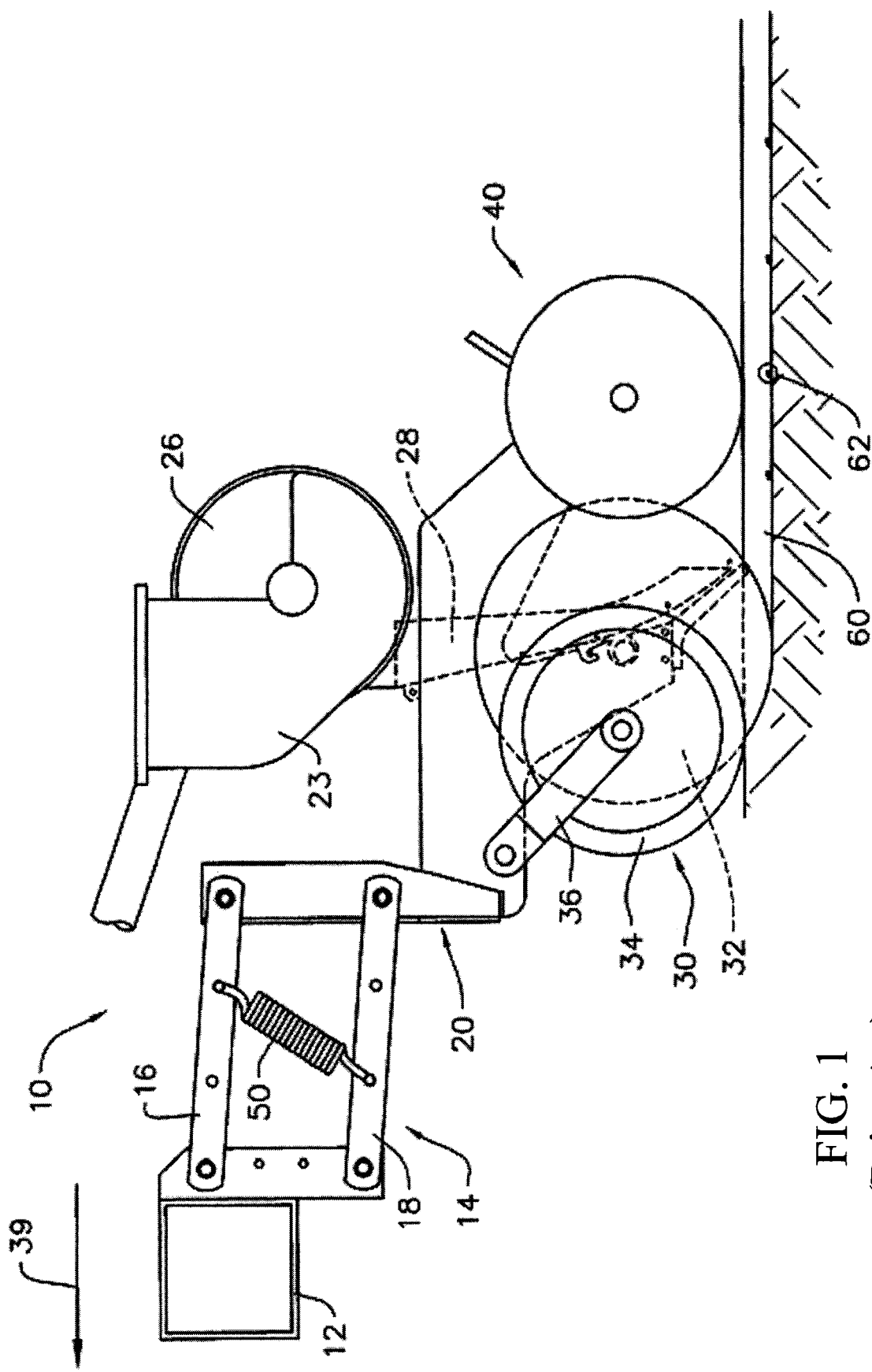
FIG. 1 is a left side elevation view of a prior art row unit of an agricultural row crop planter.

Referring now to the drawings, wherein like reference numerals designate identical or corresponding parts throughout the several views, FIG. 1 illustrates a side elevation view of a single row unit 10 of a conventional row crop planter such as the type disclosed in U.S. Pat. No. 7,438,006, the disclosure of which is hereby incorporated herein in its entirety by reference. As is well known in the art, the row units 10 are mounted in spaced relation along the length of a transverse toolbar 12 by a parallel linkage 14, comprised of upper and lower parallel arms 16, 18 pivotally mounted at their forward ends to the transverse toolbar 12 and at their rearward end to the row unit frame 20. The parallel linkage 14 permits each row unit 10 to move vertically independently of the toolbar 12 and the other spaced row units in order to accommodate changes in terrain or rocks or other obstructions encountered by the row unit as the planter is drawn through the field.

The row unit frame 20 operably supports a seed hopper 23 which may be adapted to receive seed from a bulk hopper (not shown), a seed meter 26 and a seed tube 28 as well as a furrow opener assembly 30 and furrow closing assembly 40. The furrow opening assembly 30 comprises a pair of furrow opener discs 32 and a pair of gauge wheels 34. The gauge wheels 34 are pivotally secured to the row unit frame 20 by gauge wheel arms 36. A coil spring 50 is disposed between the parallel arms 16, 18 to provide supplemental downforce to ensure that the furrow opener discs 32 fully penetrate the soil to the desired depth as set by a depth adjusting member (not shown) and to provide soil compaction for proper furrow formation. Rather than a coil spring, supplemental downforce may be provided by actuators or other suitable means such as disclosed in U.S. Pat. No. 6,389,999 to Duello, the entire disclosure of which is hereby incorporated herein by reference.

In operation, as the row unit 10 is lowered to the planting position, the opener discs 32 penetrate into the soil. At the same time, the soil forces the gauge wheels 34 to pivot upwardly until the gauge wheel arms 36 abut or come into contact with the stop position previously set with the furrow depth adjusting member (not shown) or until a static load balance is achieved between the vertical load of the row unit and the reaction of the soil. As the planter is drawn forwardly in the direction indicated by arrow 39, the furrow opener discs cut a V-shaped furrow 60 into the soil while the gauge wheels 34 compact the soil to aid in formation of the V-shaped furrow. Individual seeds 62 from the seed hopper 23 are dispensed by the seed meter 26 into an upper opening in the seed tube 28 in uniformly spaced increments. As seeds 62 fall through the seed tube 28, the seeds move downwardly and rearwardly between the furrow opener discs 32 and into the bottom of the V-shaped furrow 60. The furrow 60 is then covered with soil and lightly compacted by the furrow closing assembly 40.

It should be appreciated that because seeds 62 fall freely through the seed tube 28 in the row unit 10 described above, the path of travel of the seeds and the velocity of the seeds at the exit of the seed tube are relatively unconstrained. It would be preferable to constrain the path of travel of seeds 62 in order to reduce errors in spacing between seeds; i.e., placing seeds in the field at non-uniform spacing. Additionally, it would be preferable to control the velocity of seeds 62 such that the seeds have a decreased horizontal velocity relative to the ground upon landing in the furrow 60.

Figure 2:
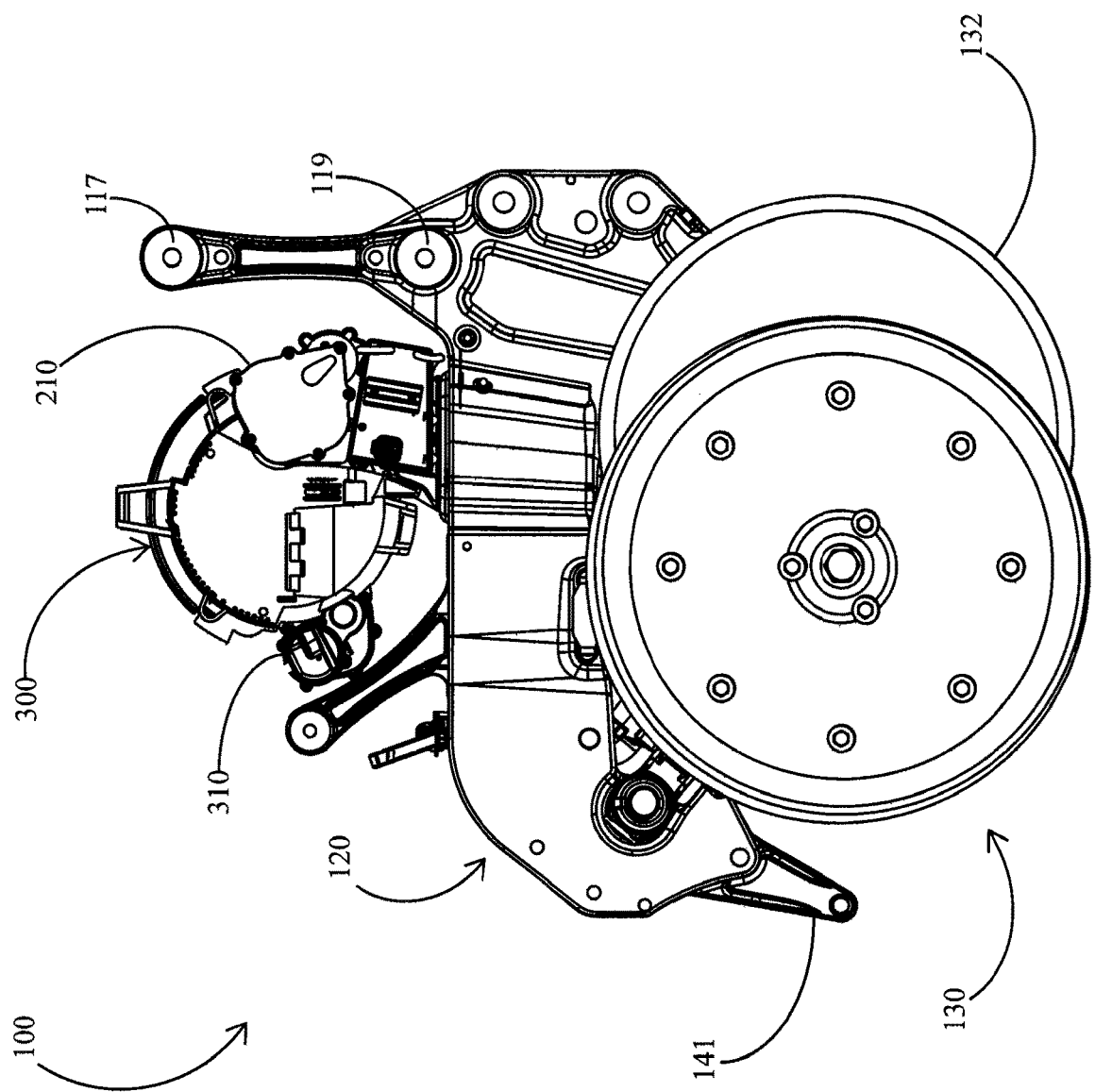
FIG. 2 is a right side elevation view of an embodiment of a row unit including a seed conveyor.
Figure 3:
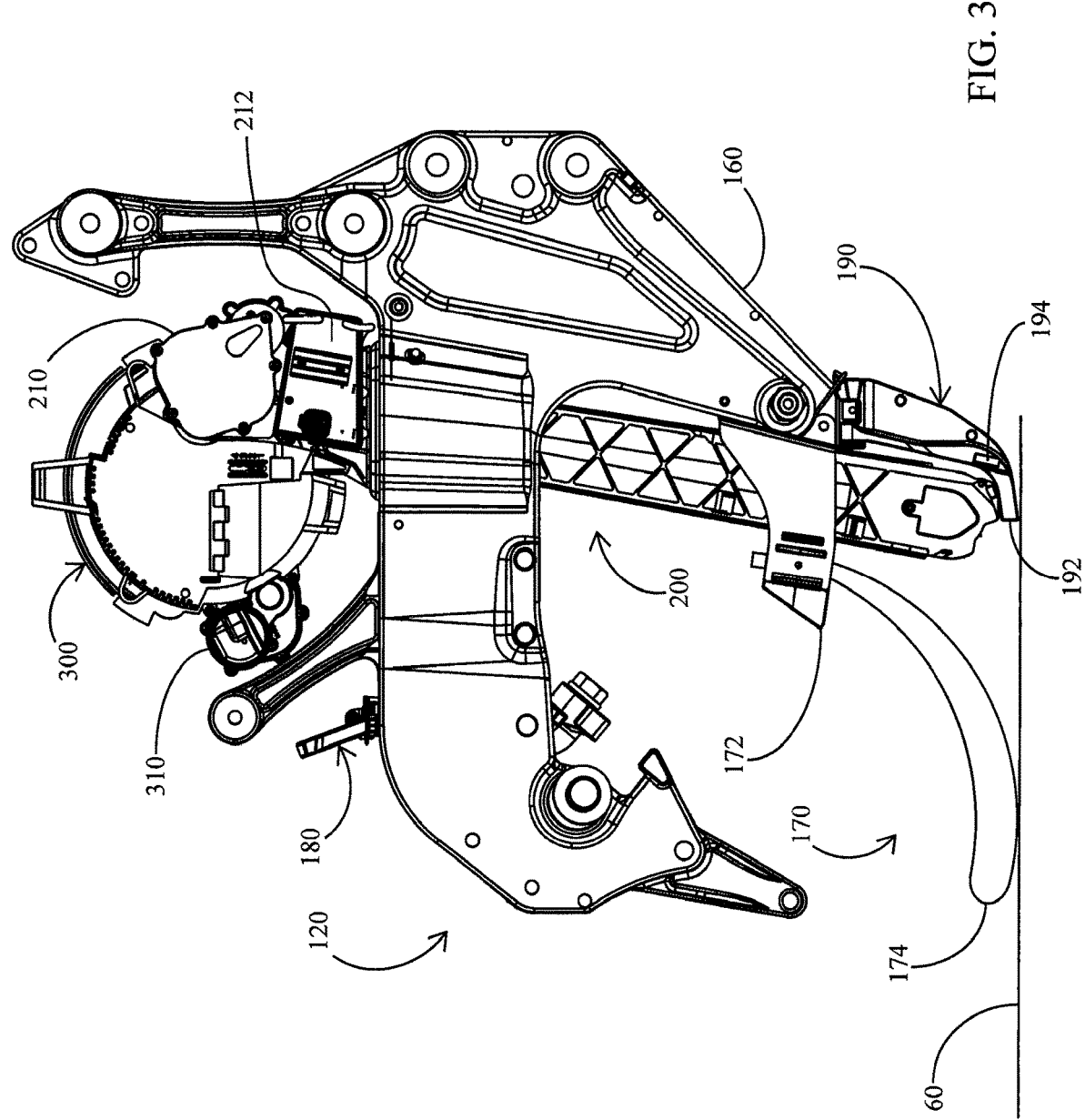
FIG. 3 is a right side elevation view of the row unit of FIG. 2 with further components removed for illustration purposes.
Figure 4:
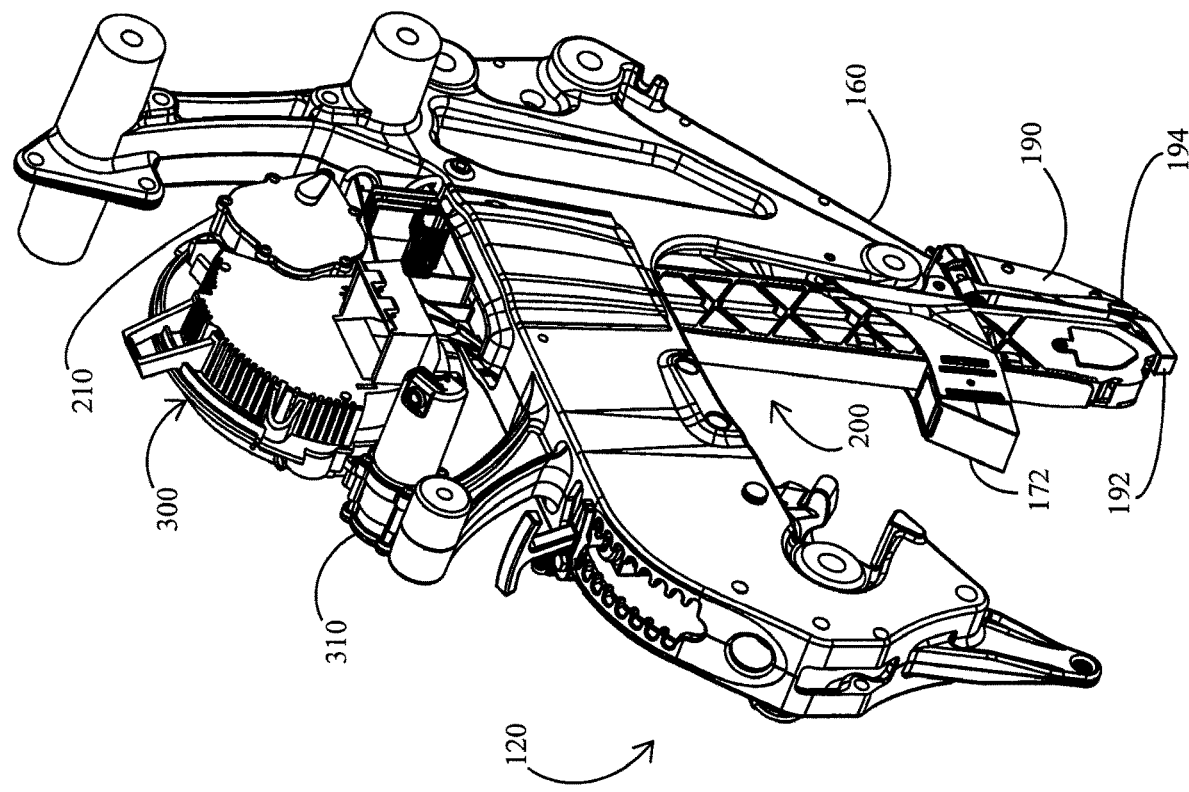
FIG. 4 is a rear perspective view of the row unit of FIG. 2 with further components removed for illustration purposes.

Referring to FIGS. 2 through 4, a row unit 100 including a seed conveyor 200 is illustrated. The row unit 100 preferably includes a gauge wheel assembly 130 and left and right opening discs 132 disposed to open a seed trench 60; a depth control assembly 180 preferably controls the height of gauge wheels of the gauge wheel assembly 130 relative to the opening discs 132. The row unit 100 preferably includes a row unit frame 120. The row unit frame preferably includes mounting pivots 117, 119 for mounting the row unit frame 120 to a parallel arm arrangement. The row unit frame 120 preferably includes a rear mount 141 for pivotally mounting a closing wheel assembly (not shown) configured to close the seed trench 60. The row unit frame 120 preferably includes a downwardly-extending shank 160 to which the opening discs 132 are rollingly mounted.

A seed meter 300 is mounted to the row unit frame 120. The seed meter 300 is preferably driven by a motor 310 as disclosed in Applicant's co-pending U.S. patent application Ser. No. 13/804,630 and Applicant's co-pending International Patent Application No. PCT/US2013/051971 ("the '971 application"), the disclosures of both of which are incorporated herein in their entirety by reference.

The seed conveyor 200 is preferably mounted to the row unit 100 as disclosed in Applicant's co-pending International Patent Application No. PCT/US2012/057327 ("the '327 application") and/or U.S. Provisional Patent Application No. 61/872,319, the disclosures of both of which are hereby incorporated herein in their entirety by reference. A resilient seal 124 preferably seals a gap between the seed conveyor 200 and the row unit frame 120. The seed conveyor 200 is in seed communication with the seed meter 300. The seed conveyor 200 is preferably driven by a motor 210. The motor 210 preferably comprises an electric motor operably coupled to a gearbox. The motor 210 is preferably in electrical communication with and controlled by a control module 212.

Figure 22:
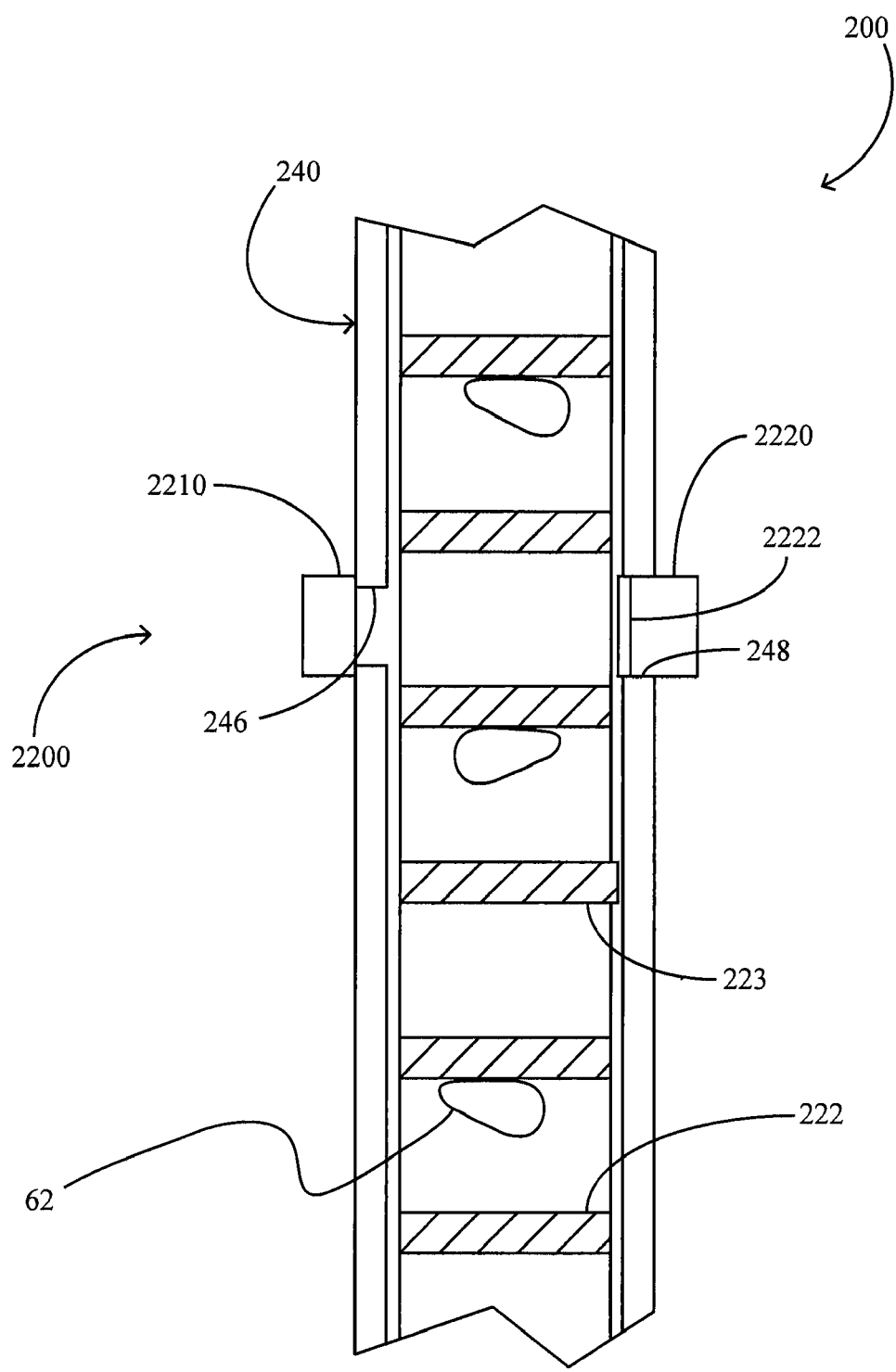
FIG. 22 is a front elevation view of an embodiment of a seed conveyor and seed sensor.

Referring to FIG. 22, the seed conveyor 200 preferably includes a seed sensor 2200 disposed to detect passing seeds. The seed sensor 2200 preferably comprises a transmitter 2210 configured to send electromagnetic energy (e.g. light) toward a receiver 2220. As illustrated, the transmitter 2210 is preferably disposed to illuminate a region through which seeds and flights pass, preferably through an opening 246 in a first sidewall of the conveyor cover 240. The sensor 2200 is preferably disposed to detect seeds descending downward in the conveyor 200, e.g., adjacent to a forward portion of the belt 220. The receiver 2220 is preferably disposed in an opening 248 in an opposing second sidewall of the conveyor cover 240. Passing seeds 62 obstruct the light transmitted to the receiver such that the receiver generates a "seed pulse"; the receiver is preferably in data communication with the monitor, which is preferably configured to process, time-stamp and store pulses. In preferred embodiments, the receiver 2220 includes a lens 2222 (e.g. a quartz lens). In some embodiments the lens is coated with a hydrophobic coating. In some embodiments a portion of the receiver 2220 (e.g., the lens 222 or a portion thereof) extends into the interior of the conveyor cover 240; in such embodiments, a wiper flight 223 (or a plurality of flights) is preferably disposed (e.g., by being slightly wider than the remaining flights) to contact the receiver 2220 (e.g., the interior surface of the lens) in order to wipe foreign material from the receiver as the wiper flight passes the receiver. In some embodiments the transmitter may also include a lens (not shown) disposed to be contacted by one or more conveyor flights.

A protector 190 is preferably removably mounted to the shank 160. A rearwardly extending portion 192 of the protector 190 preferably extends between a lower end of the seed conveyor 200 and the bottom of the trench 60. The rearwardly extending portion 192 is thus disposed to protect the seed conveyor 200 from contact with the bottom of the trench 60 or other objects which may damage the seed conveyor. A lower surface of the rearwardly extending portion 192 is preferably disposed at a height proximate the lower extent of the opener discs 132 such that the protector 190 forms the bottom of the trench 60 in operation. In other embodiments, the lower surface of the rearwardly extending portion 192 is disposed at a height above (e.g., between 0.1 and 1 inches above) the lower extent of the opener discs such that the protector 190 is positioned above and vertically adjacent to the bottom of the trench 60 in operation. The protector 190 preferably includes inserts 194 disposed on either side of the protector; the inserts 194 are preferably disposed to guard the seed conveyor 200 from contact with the opening discs 132. The inserts 194 preferably comprise a relatively hard material such as tungsten carbide, while the remainder of the protector 190 preferably comprises a relatively tough metal.

A seed firmer assembly 170 is preferably mounted to the shank 160. The seed firmer assembly 170 preferably includes a firmer bracket 172 and a seed firmer 174. The firmer bracket 172 preferably extends around the seed conveyor 200 and supports the seed firmer 174 rearward of the seed conveyor. The seed firmer 174 is preferably configured to press seeds into the bottom of the trench 60; the seed firmer 174 preferably comprises one of the seed firmer embodiments disclosed in U.S. Pat. No. 7,497,174, the disclosure of which is hereby incorporated herein in its entirety by reference.

Figure 5:
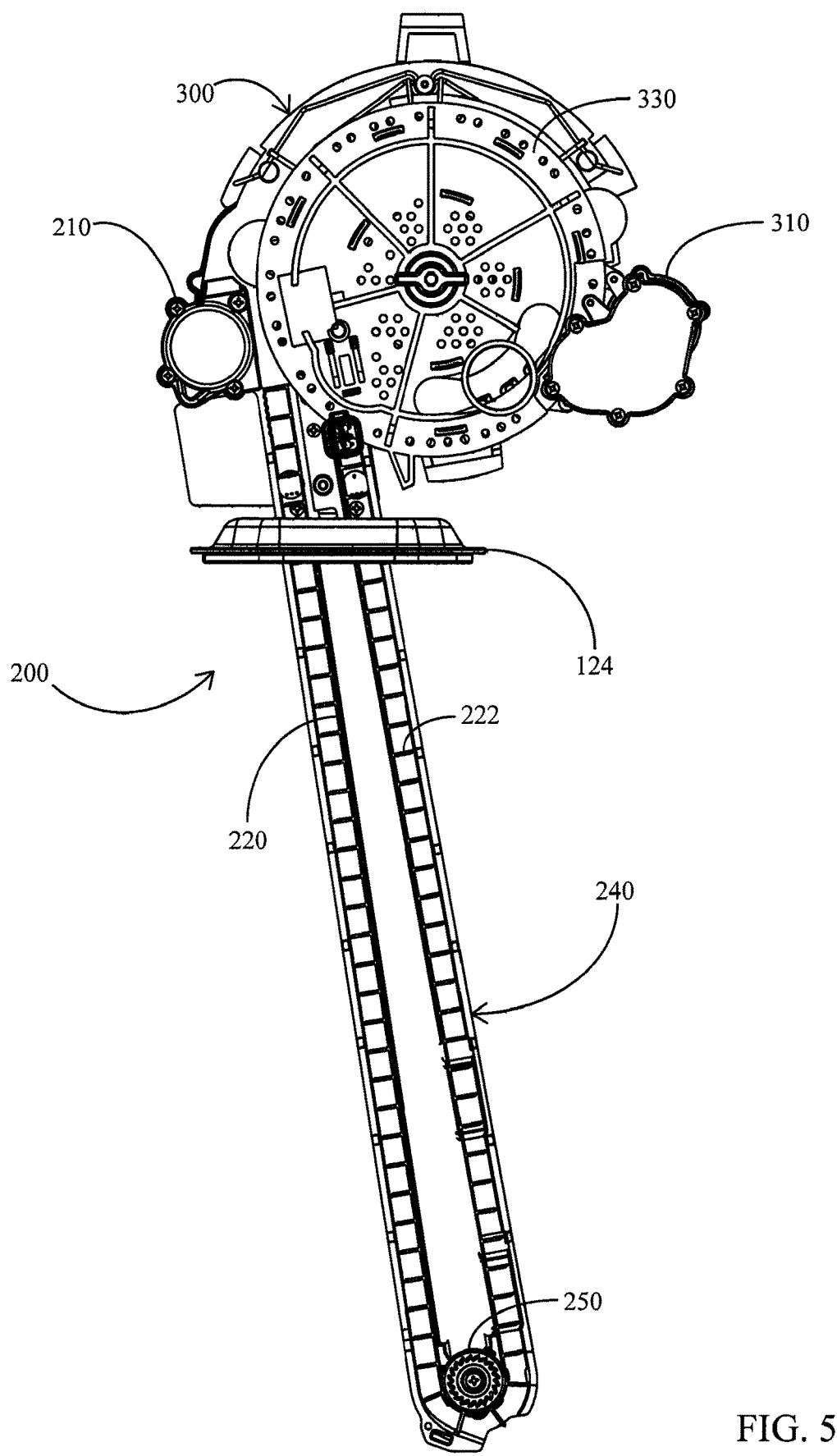
FIG. 5 is a left side elevation view of an embodiment of a seed meter and an embodiment of a seed conveyor of the row unit of FIG. 2.
Figure 6A:
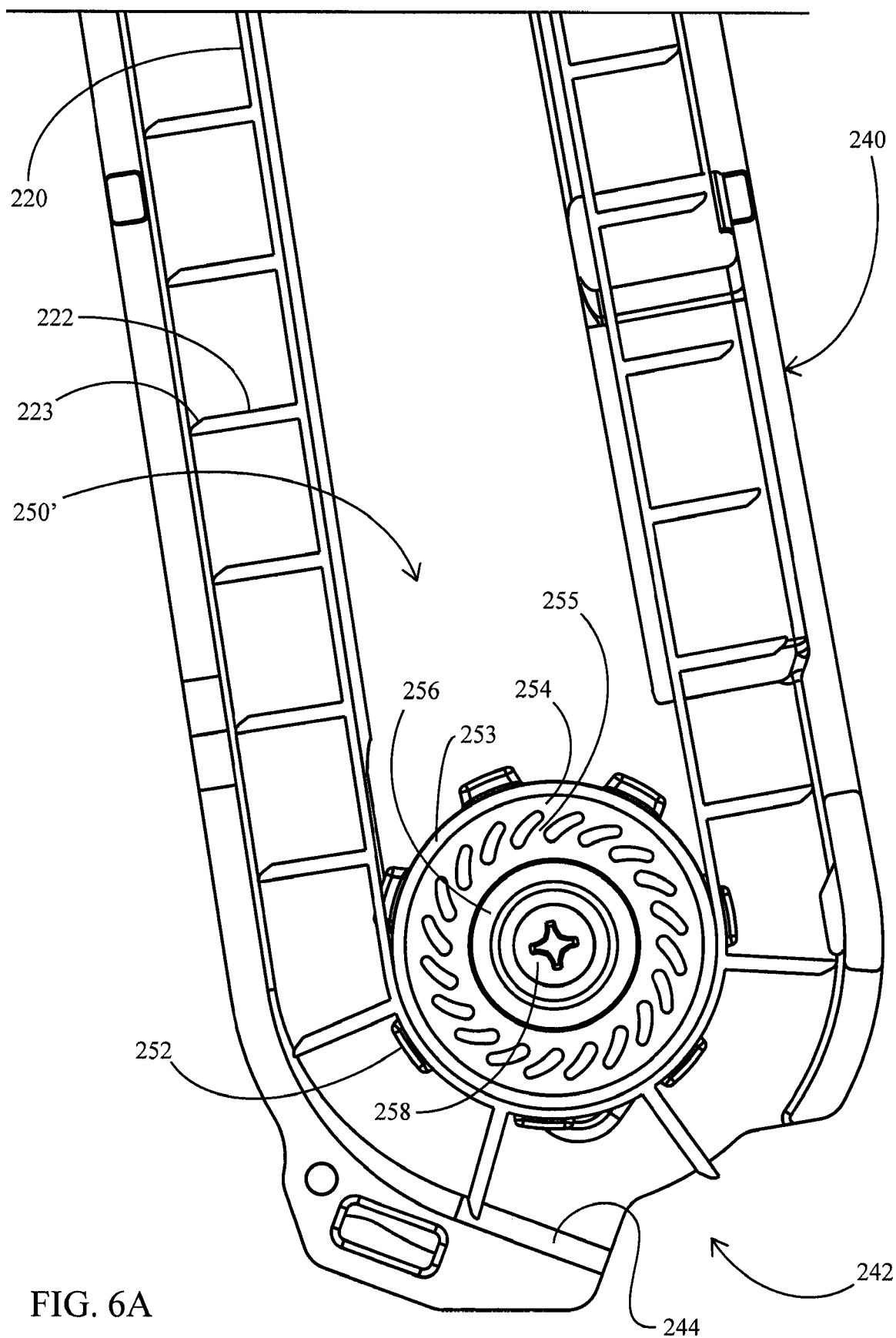
FIG. 6A is an enlarged left side elevation view of an embodiment of a lower pulley.

Turning to FIG. 5, the seed conveyor 200 is illustrated in more detail. The seed conveyor 200 preferably includes a belt 220 including a plurality of flights 222 spaced to receive seeds. Each flight 222 preferably includes a bevel 223 (see FIG. 6A); each bevel 223 preferably faces away from the direction of travel of the flight. The seed conveyor 200 preferably includes a cover 240, preferably comprising a left-side portion and a right-side portion; the left-side portion of the cover 240 is removed in FIGS. 5, 6A and 6B in order to illustrate the belt 220. Referring to FIG. 6A, in operation seeds are conveyed down a forward side of the belt 220 between the flights 222. Seeds are preferably released from an opening 242 at a lower end of the cover 240. Seeds are preferably released in a rearward trajectory (preferably guided by a lower surface 244 of the cover 240); thus the seeds have a lower horizontal velocity relative to the trench 60 upon release from the seed conveyor 200 than when released from the seed meter 300.

Pulley Embodiments

Figure 7:
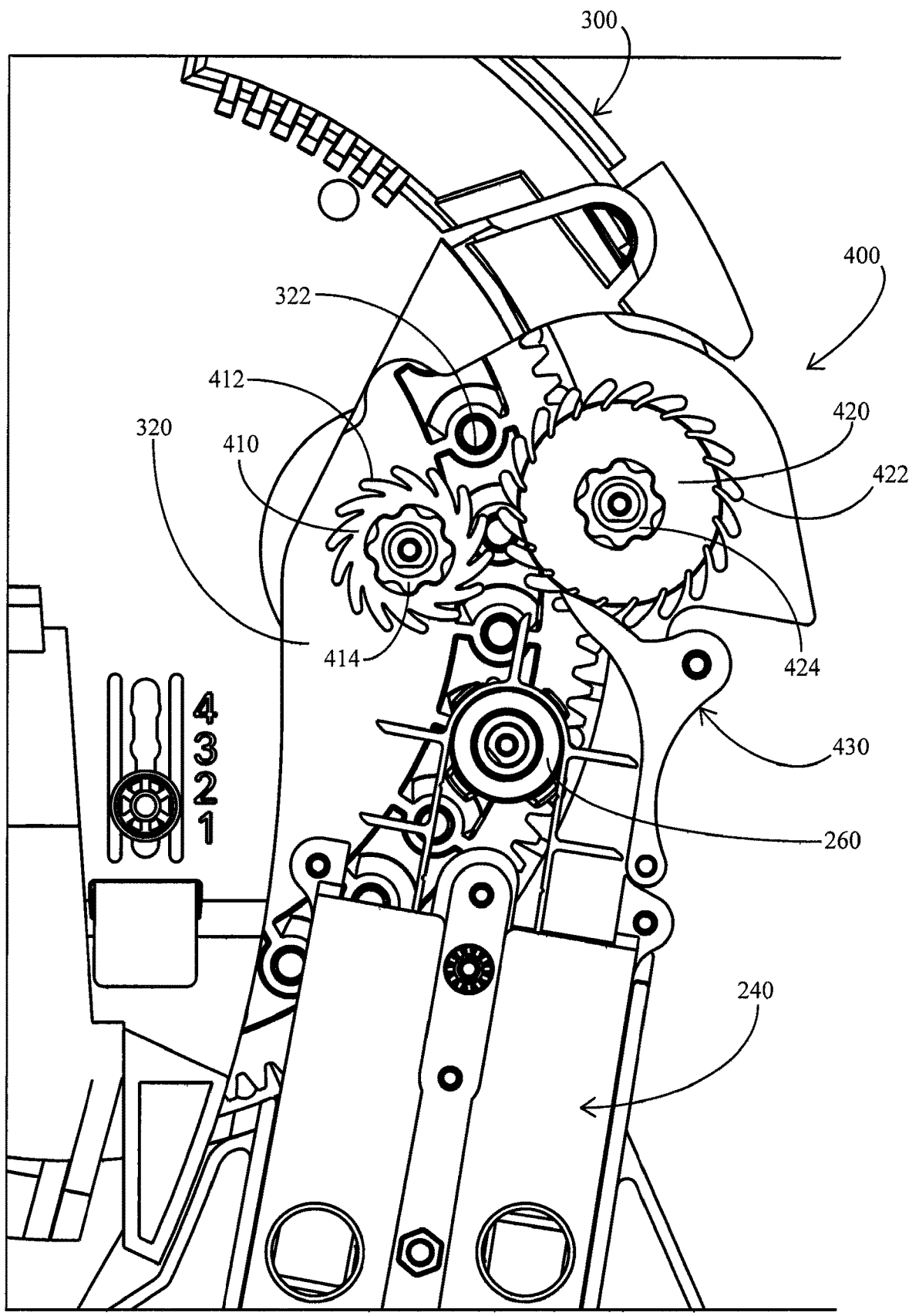
FIG. 7 is an enlarged right side elevation view of an embodiment of a loading wheel assembly and an embodiment of a seed disc.
Figure 8:
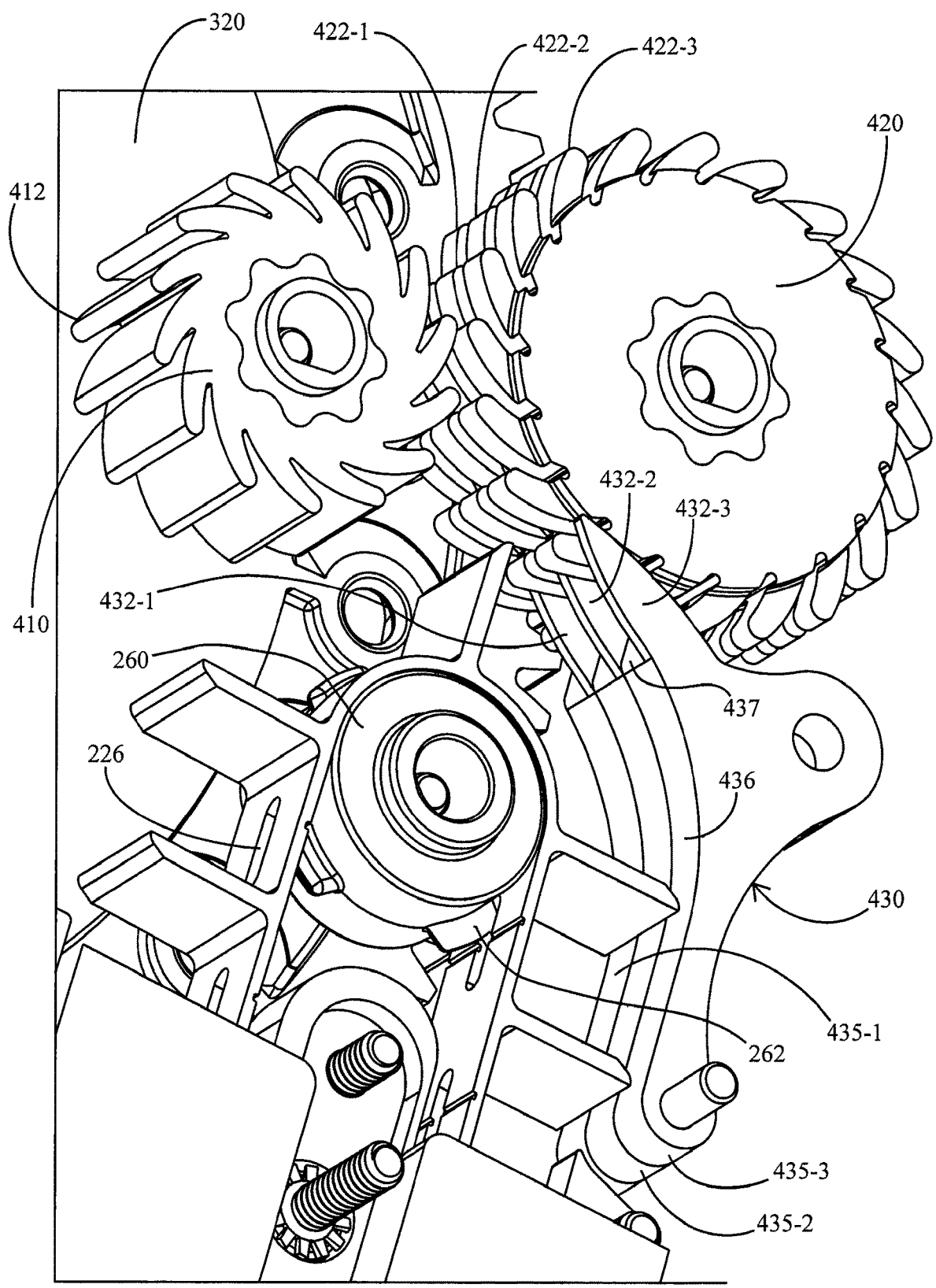
FIG. 8 is an enlarged upward perspective view of the loading wheel assembly of FIG. 7.

Referring to FIGS. 5 and 7, the belt 220 is preferably operably coupled to an upper pulley 260 and a lower pulley 250 for conveyance about the upper pulley and the lower pulley. The upper pulley 260 is preferably rotationally driven by the motor 210. Referring to FIG. 8, the upper pulley 260 preferably includes a plurality of radially arranged lugs 262 configured to engage corresponding slots 226 formed in the belt 220 between each flight 222. In operation, the upper pulley 260 preferably drives the belt 220 by sequential engagement between the slots 226 and the lugs 262. Each slot 226 preferably extends through the full width of the belt 220. Each lug 262 preferably extends through the belt 220 when the lug is engaged in the slot 226 such that an outer tip of the lug extends outside the belt.

Turning to FIG. 6A, a first detailed embodiment of a lower pulley 250' is illustrated. The lower pulley 250' preferably comprises a radial outer surface 253 rigidly mounted to an inner wheel 254. The radial outer surface 253 preferably comprises a relatively rigid material such as plastic. The radial outer surface 253 preferably includes a plurality of radially arranged lugs 252 configured to engage corresponding slots 226 formed in the belt 220. The inner wheel 254 preferably comprises a relatively elastic material such as rubber. The inner wheel 254 preferably includes a plurality of spokes 255 radially arranged in a swept arrangement. The inner wheel 254 of the lower pulley 250' is preferably mounted to a bearing 256. The bearing 256 is preferably mounted to the cover 240 by a screw 258. When the spokes 255 are in a relaxed (undeflected) state, the radial outer surface 253 rotates about a central axis of the bearing 256. Tension in the belt 220 imparts an upward force on the lower pulley 250' such that the spokes 254 are deflected and the radial outer surface 253 is deflected upward and the radial outer surface rotates about an axis above the central axis of the bearing 256. The tension in the belt 220 upon installation is preferably selected such that the spokes 255 are preferably partially deflected; thus the rotational axis of the radial outer surface 253 is permitted to float upward and downward to retain consistent tension in the belt 220 as components wear or deform over time. Thus the pulley 250' is configured to deform to resiliently retain consistent belt tension.

Figure 6B:
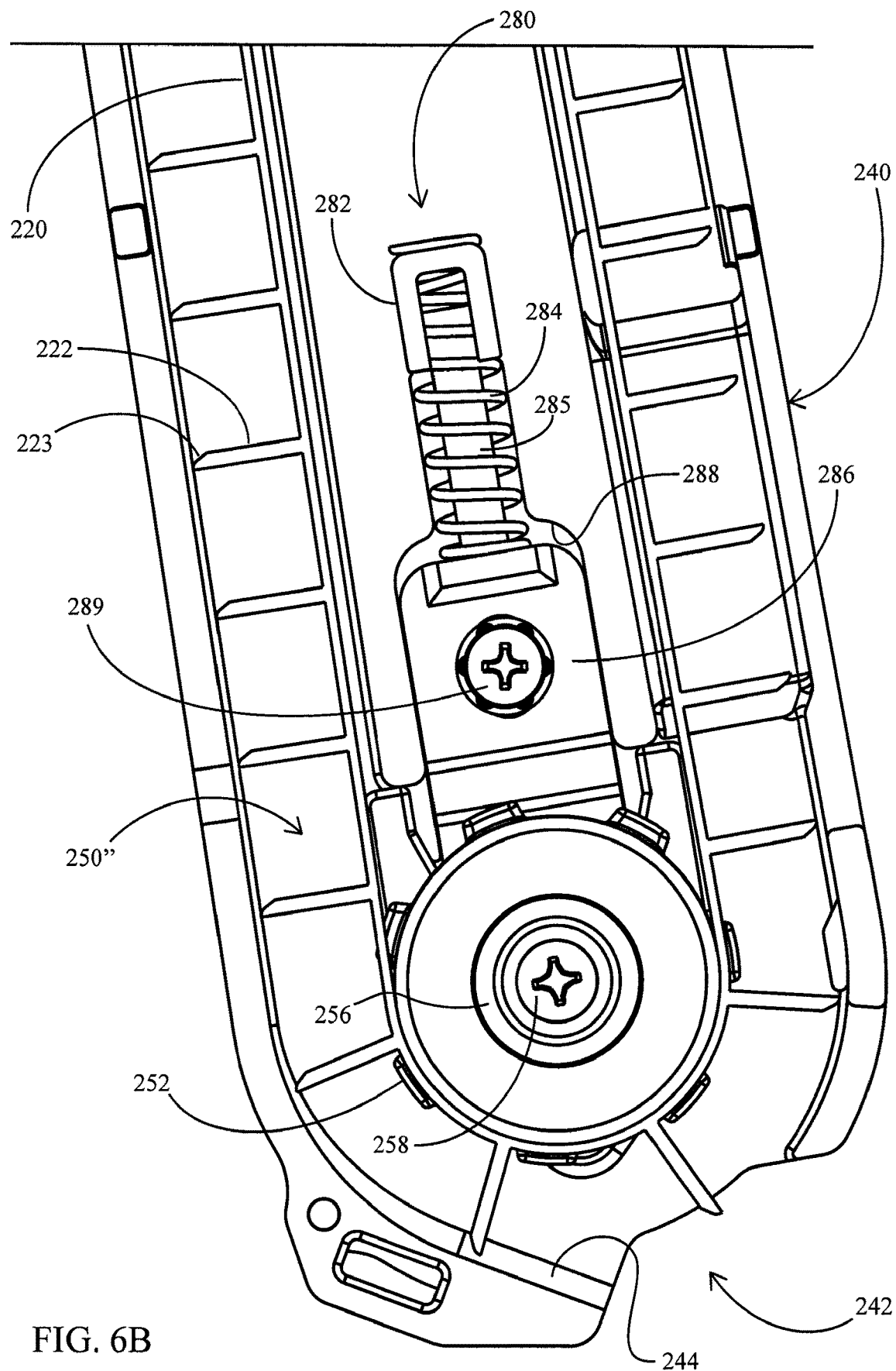
FIG. 6B is an enlarged left side elevation view of another embodiment of a lower pulley.

Turning to FIG. 6B, a second detailed embodiment of a lower pulley 250" preferably comprises a relatively hard material such as plastic. In such an embodiment, it should be appreciated that the lower pulley 250" is unable to deform to compensate for changes in tension of the belt 220; thus in such an embodiment the lower pulley 250" is preferably resiliently mounted to the cover 240. In the illustrated embodiment, the seed conveyor 200 includes a spring mount assembly 280. The spring mount assembly 280 includes a sliding member 286 slidingly received in a cavity 288. The lower pulley 250" is preferably rollingly mounted to the sliding member 286 about a bearing 256. The bearing 256 is preferably mounted to the sliding member by a screw 258. The belt 220 engages and imposes an upward force on the pulley 250". The upward force imposed by the belt on the pulley 250" is transmitted to the sliding member 286. The upward force on the sliding member 286 is preferably countered by downward force imposed on the sliding member 286 by a spring 284. The position of spring 284 is preferably maintained by a pocket 282 in the cover 240 and by a rod 285 mounted to the sliding member 286. It should be appreciated that the downward force imposed by spring 284 increases as the lower pulley 250" is deflected upward. The spring 284 is preferably partially deflected upon installation of the belt 222 such that the lower pulley 250" is enabled to deflect or "float" upward and downward to retain consistent tension in the belt 220.

Continuing to refer to FIG. 6B, a bolt 289 is preferably received by a threaded hole in the sliding member 286. The sliding member 286 may be selectively locked in a fixed position relative to the cavity 288 by advancing the bolt 289 into contact with the cover 240. In some embodiments the sliding member 286 is locked in place upon installation (after the spring mount assembly 280 has reached an equilibrium state. In other embodiments the sliding member is allowed to move freely in operation.

Figure 23:
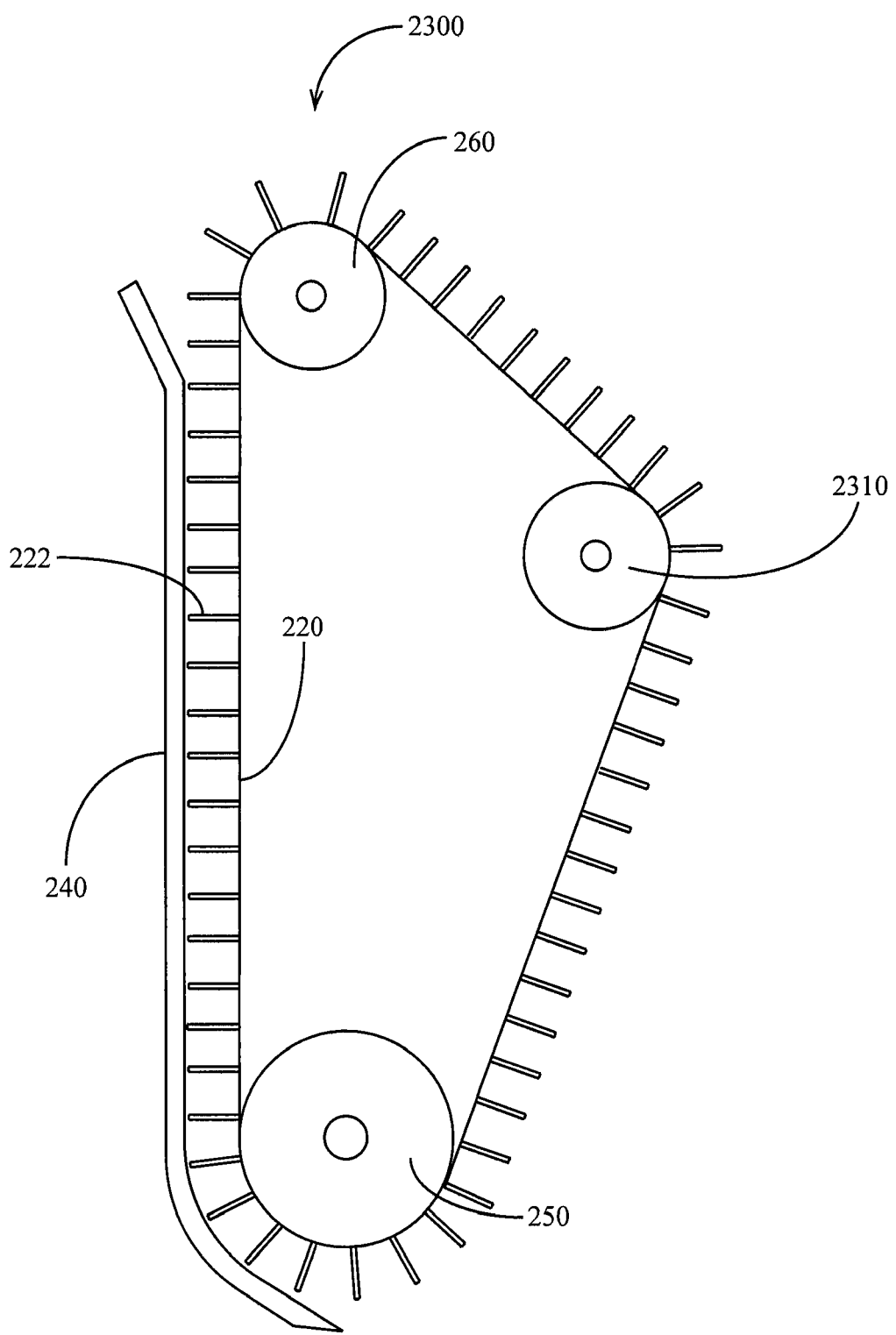
FIG. 23 is a side elevation view of an embodiment of a seed conveyor having a third pulley.

In an alternative conveyor embodiment 2300 illustrated in FIG. 23, a the belt 220 is disposed to rotate about the upper pulley 260, the lower pulley 250 and third pulley 2310. Flights 222 preferably pass the third pulley 2310 after passing the lower pulley 250 and before passing the upper pulley 260. The third pulley 2310 is preferably disposed at a height lower than the upper pulley and higher than the lower pulley. The center of the third pulley 2310 is preferably disposed rearward of an axis defined by the centers of the upper pulley and the lower pulley. Flights 222 preferably accelerate when rounding the third pulley 2310. Thus the third pulley 2310 is preferably disposed to urge debris or liquid between the flights 222 away from the belt by centrifugal force as the flights pass the third pulley.

Loading Wheel Assembly Embodiments

Figure 9:
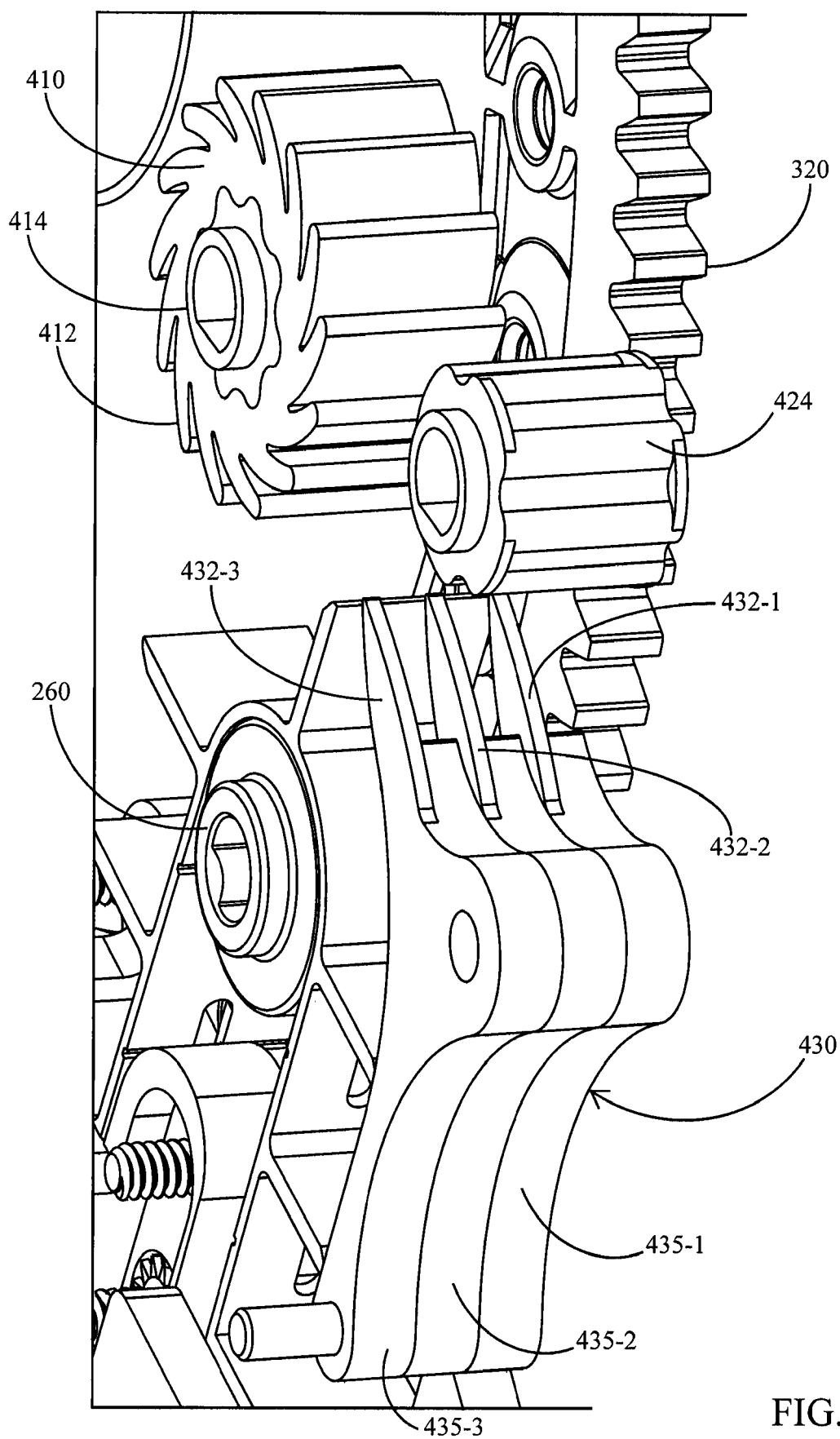
FIG. 9 is an enlarged downward perspective view of the loading wheel assembly of FIG. 7.

Referring to FIGS. 7 through 9, the seed conveyor 200 preferably includes a loading wheel assembly 400. The loading wheel assembly 400 is preferably configured to remove seeds from the seed meter and transfer them to the seed conveyor 200.

A brief description of the operation of the seed meter 300 is helpful in order to describe its cooperation with the seed conveyor 200, specifically the loading wheel assembly 400. The seed meter 300 includes a seed disc 320 having a plurality of radially arranged seed apertures 322. As disclosed in more detail in the '971 application incorporated by reference above, the seed meter 300 is preferably configured to entrain a seed on each seed aperture (preferably by imposing a vacuum on one side of the apertures) and release the seed at a release point (preferably by cutting off the imposed vacuum), preferably at approximately the 3 o'clock position as viewed along the perspective of FIG. 7. The apertures 322 translate the seeds along a seed path. The seed path is preferably a semi-circular path defined by the positions of the apertures 322. As viewed along the perspective of FIG. 7, seeds travel clockwise along the seed path.

The loading wheel assembly 400 is preferably configured to remove seeds from the seed disc 320 at a location along the seed path, preferably prior to the release point. In the embodiment of FIG. 7, the loading wheel assembly 400 includes a first loading wheel 410 and a second loading wheel 420. The first loading wheel 410 and the second loading wheel 420 are preferably disposed on opposite sides of the seed path. The first loading wheel 410 preferably has a smaller effective circumference than the second loading wheel 420. The loading wheels 410, 420 are preferably driven for rotation about hubs 414, 424 by the motor 210. The loading wheels 410, 420 are preferably driven in opposite rotational directions. As viewed along the perspective of FIG. 7, the first loading wheel 410 is driven for clockwise rotation and the second loading wheel 420 is driven for counter-clockwise rotation. In operation, seeds passing through a gap between the loading wheels 410, 420 are grasped between the loading wheels and ejected downward toward the seed conveyor 200. As viewed along the perspective of FIG. 7, seeds enter the seed conveyor 200 above the upper pulley 260 and are conveyed down the right-hand side of the seed conveyor. The gap between the loading wheels 410, 420 is preferably sized to grasp the seeds; e.g., in some embodiments the gap is slightly smaller than a minimum width of the seed.

Figure 10:
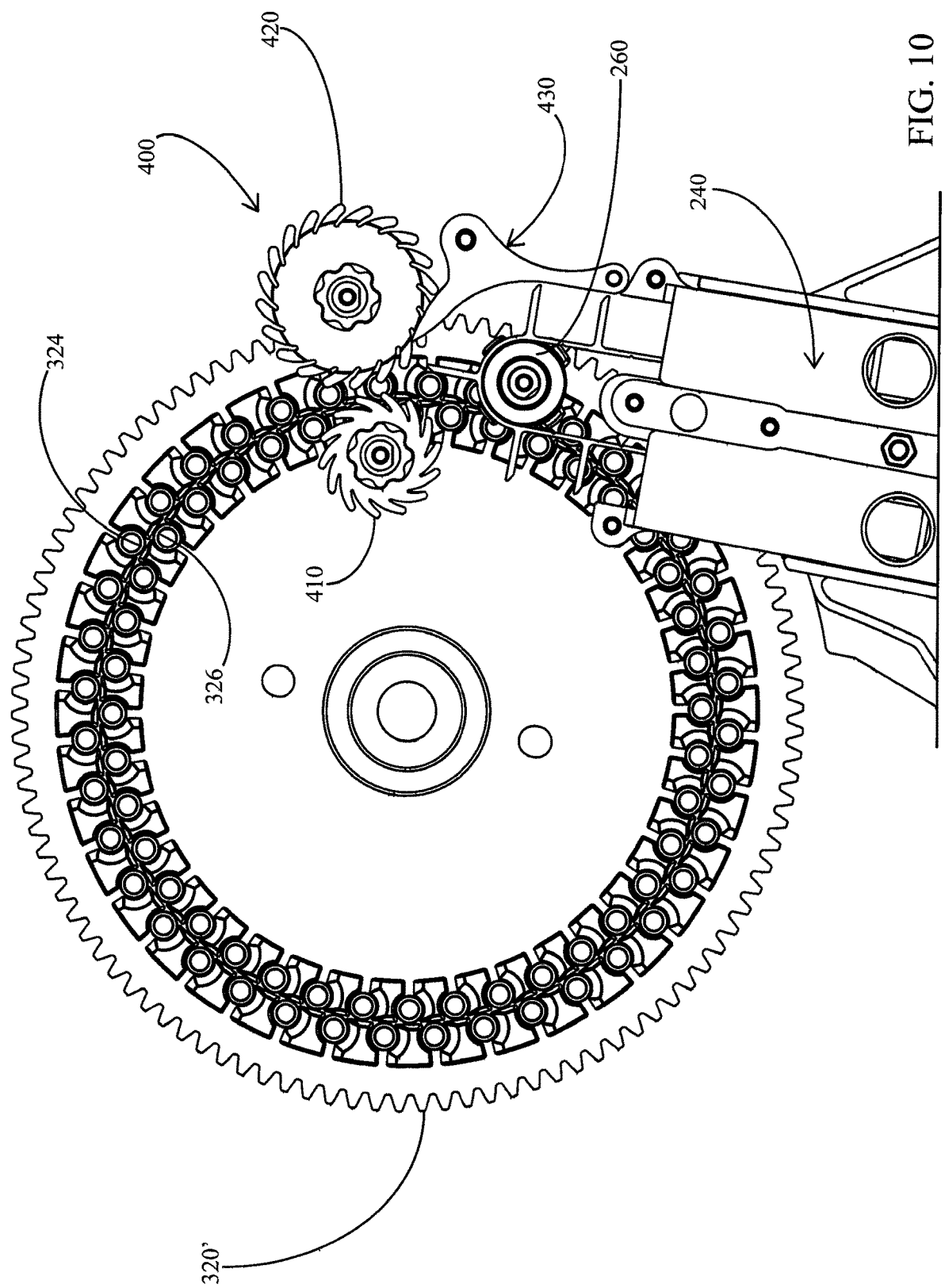
FIG. 10 is a right side elevation view of the loading wheel assembly embodiment of FIG. 7 and another embodiment of a seed disc.

In the embodiment of FIGS. 7-9, the seed disc 320 includes a single array of seed apertures 322 defining a seed path; the seed path preferably intersects a gap between the loading wheels 410, 420. Turning to FIG. 10, an alternative seed disc 320' includes an outer array of outer seed apertures 324 and an inner array of inner seed apertures 326. The outer array defines an outer seed path traveled by seeds entrained on the outer seed apertures 324. The inner array defines an inner seed path traveled by seeds entrained on the inner seed apertures 326. The outer seed path preferably intersects the gap between the loading wheels 410, 420. The inner seed path preferably intersects the first loading wheel 410; seeds on the inner seed apertures 326 are guided by rotation of the first loading wheel 410 into the gap between the loading wheels 410, 420.

Figure 24:
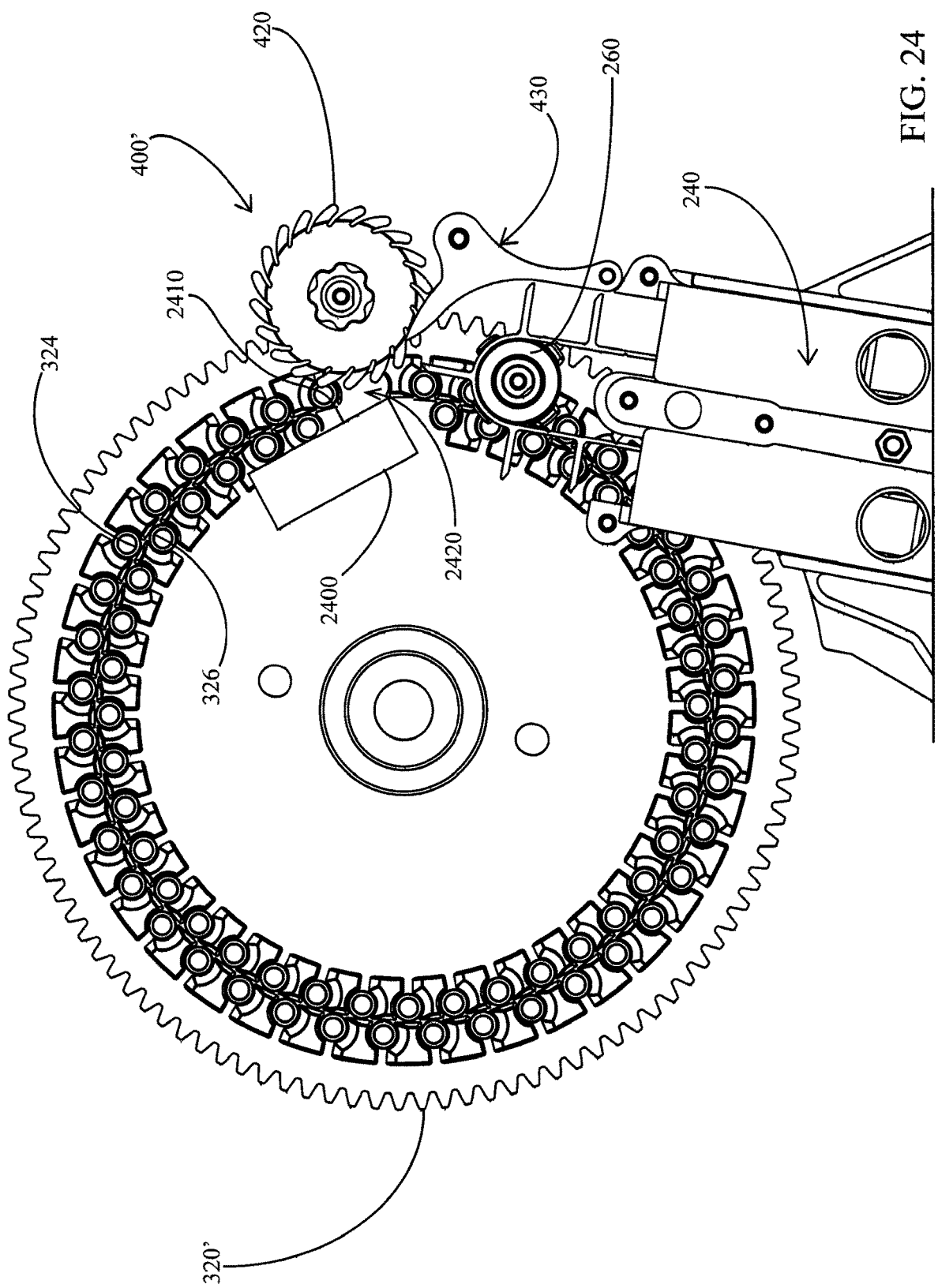
FIG. 24 is a side elevation view of another embodiment of a loading wheel assembly having a guide insert.

An alternative loading wheel assembly 400' illustrated in FIG. 24 comprises the loading wheel 420 and a guide insert 2400 having a guide surface 2410. The guide surface 2410 is preferably disposed to guide seeds on the seed apertures toward a gap 2420 between the guide surface 2410 and the loading wheel 420. In operation, as seeds enter the gap 2420, the seeds are preferably lightly compressed between the loading wheel 420 and the surface 2410, and are then ejected into the belt 220 between the flights 222, preferably forward of a vertical plane defined by the rotational axis of the upper pulley 260. As illustrated in FIG. 24, the alternative loading wheel assembly 400' is used in cooperation with the seed disc 320'; however, it should be appreciated that the alternative loading wheel assembly 400' may be used in cooperation with other seed discs such as the seed disc 320.

Returning to the embodiment of FIGS. 7-9, the loading wheels 410, 420 include a plurality of circumferential fingers 412, 422, respectively. The fingers 412, 422 are preferably oriented in a direction opposite the direction of rotation of their respective loading wheels 410, 420. Thus the fingers 412, 422 are oriented in a backswept orientation. As best illustrated in FIG. 8, each finger 422 of the second loading wheel 420 preferably comprises three axially aligned fingers 422-1, 422-2, 422-3 having axial gaps therebetween.

The fingers 412, 422 of the loading wheels 410, 420 are preferably rotationally oriented in synchronized orientations; e.g., such that when a finger 412 is at its closest position to the central axis of the loading wheel 420, a corresponding finger 422 is at its closest position to the central axis of the loading wheel 410. The motor 210 preferably drives the loading wheels 410, 420 at synchronized rates (e.g., at the same rate in terms of rotations per minute) such that the loading wheels remain synchronized as described above during operation. In other embodiments the fingers 412, 422 are oriented in unsynchronized orientations.

Figure 11:
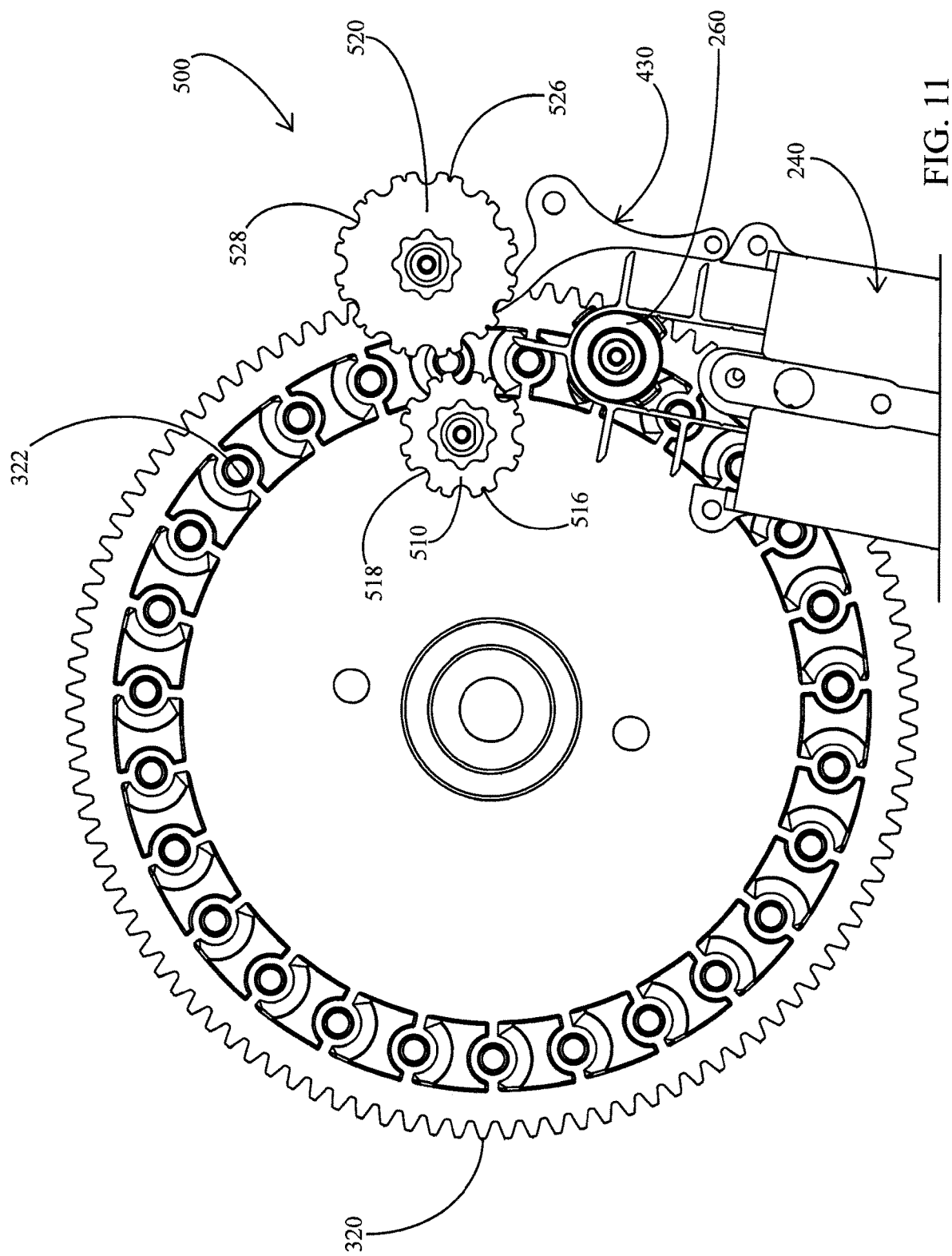
FIG. 11 is a right side elevation view of another embodiment of a loading wheel assembly.

Turning to FIG. 11, an alternative loading wheel assembly 500 preferably includes a first loading wheel 510 and a second loading wheel 520. The first loading wheel 510 preferably includes an array of circumferentially arranged large dents 518 and an array of circumferentially arranged small dents 516. Each small dent 516 is preferably disposed between two large dents 518 along the circumference of the first loading wheel 510. The second loading wheel 520 preferably includes an array of circumferentially arranged large dents 528 and an array of circumferentially arranged small dents 526. Each small dent 526 is preferably disposed between two large dents 528 along the circumference of the second loading wheel 520. The second loading wheel preferably includes axial gaps similar to the axial gaps in the second loading wheel 420 for interacting with the guide 430 described below.

Guide Embodiments

Referring to FIGS. 7-9, the loading wheel assembly 400 preferably includes a guide 430. The guide 430 preferably includes a plurality of laterally spaced fins 432-1, 432-2, 432-3. Fin 432-1 extends between the fingers 422-1 and 422-2 of the loading wheel 420. Fin 432-2 extends between the fingers 422-2 and 422-3 of the loading wheel 420. In operation, as the loading wheel 420 rotates, the fingers 422-2 pass between the fins 432-1 and 432-2. In operation, as the loading wheel 420 rotates, the fingers 422-3 pass between the fins 432-2 and 432-3. A curved inner surface of each fin 432 is preferably disposed such that a plane tangential to the curved inner surface extends between a circumference of the loading wheel 420 and a center of the loading wheel 420. The guide 430 preferably comprises three substantially identical portions 435. Each portion 435 preferably includes an arcuate surface 436; the arcuate surface 436 is preferably concave with respect to seeds traveling into the seed conveyor 200. Each arcuate surface 436 preferably terminates at an upper end at an angled surface 437. The angled surface 437 of the portion 435-3 preferably extends between the fins 432-2, 432-3; and the angled surface 437 of the portion 435-2 preferably extends between the fins 432-1, 432-2. The guide 430 preferably comprises a relatively hard material such as metal and preferably comprises powdered metal.

In operation, as seeds are communicated into the seed conveyor 200, the trajectory of seeds ejected by the loading wheels 410, 420 tends to cause the seeds to contact the guide 430. As seeds contact the guide 430, they are guided down the right-hand side of the seed conveyor 200 (as viewed along the perspective of FIG. 7) by the fins 432 and the arcuate surfaces 436, respectively.

The loading wheel assembly 500 illustrated in FIG. 11 preferably also includes a guide 430 that interacts with the second loading wheel 520 as described above with respect to the second loading wheel 420.

Brush Embodiments

Figure 14:
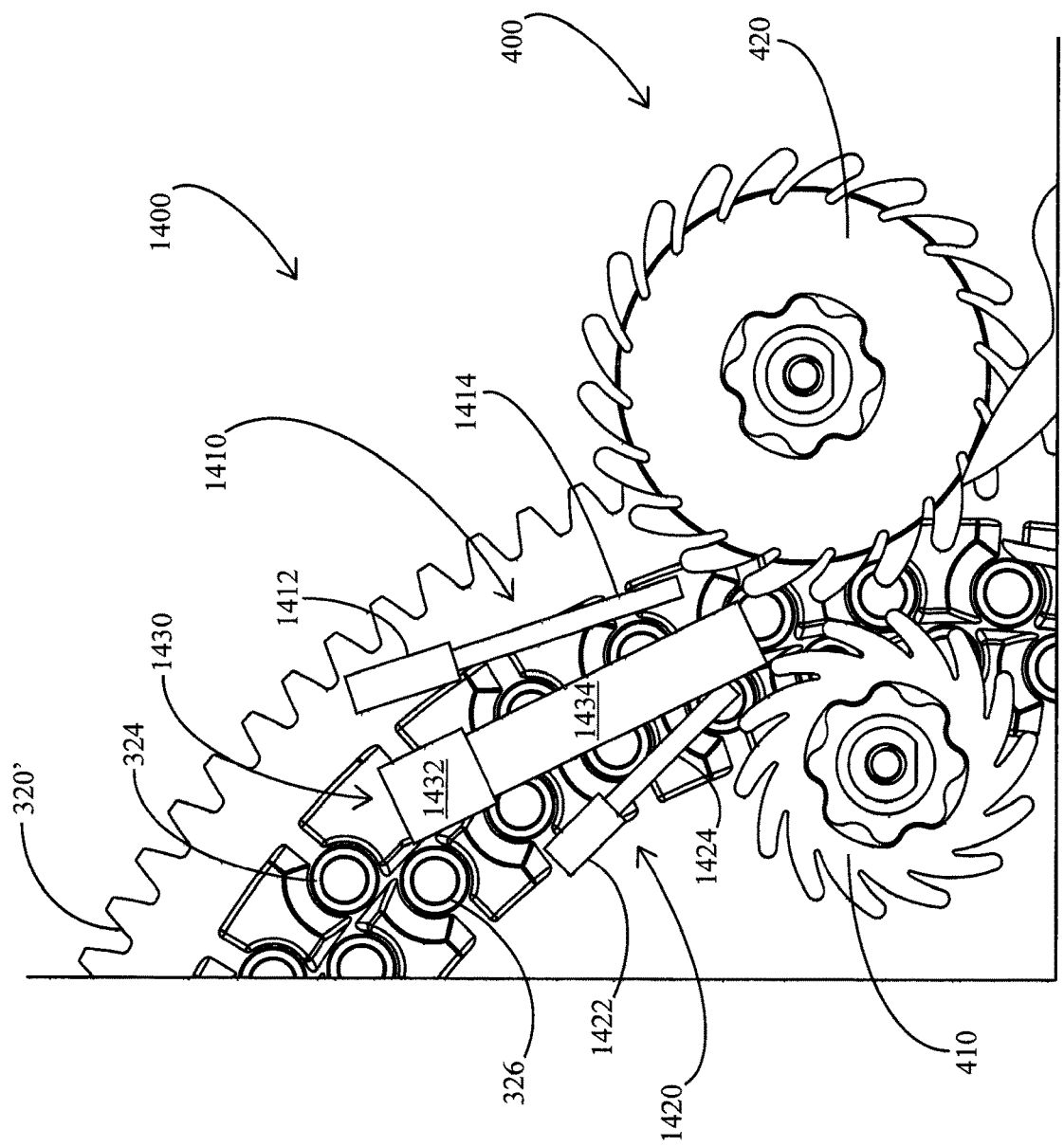
FIG. 14 is an enlarged side elevation view of the loading wheel assembly embodiment of FIG. 10 and a guide brush assembly.
Figure 15:
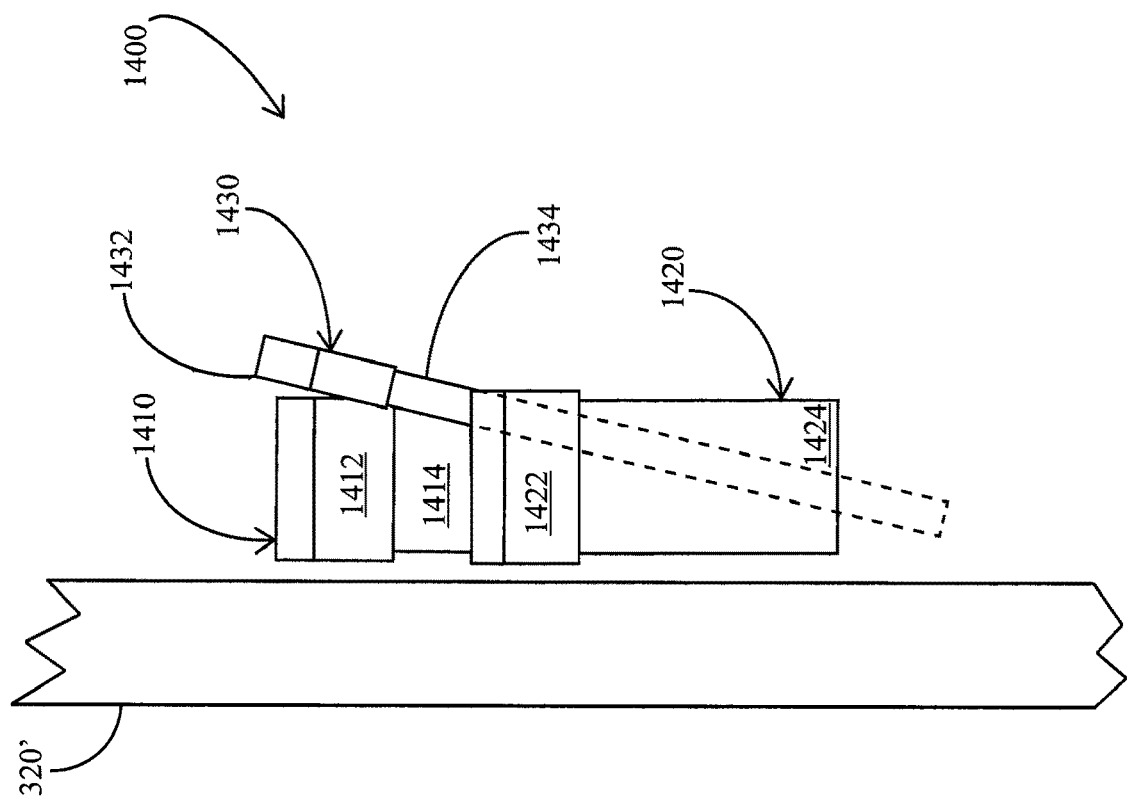
FIG. 15 is an enlarged rear elevation view of the loading wheel assembly and guide brush of FIG. 14.
Figure 17:
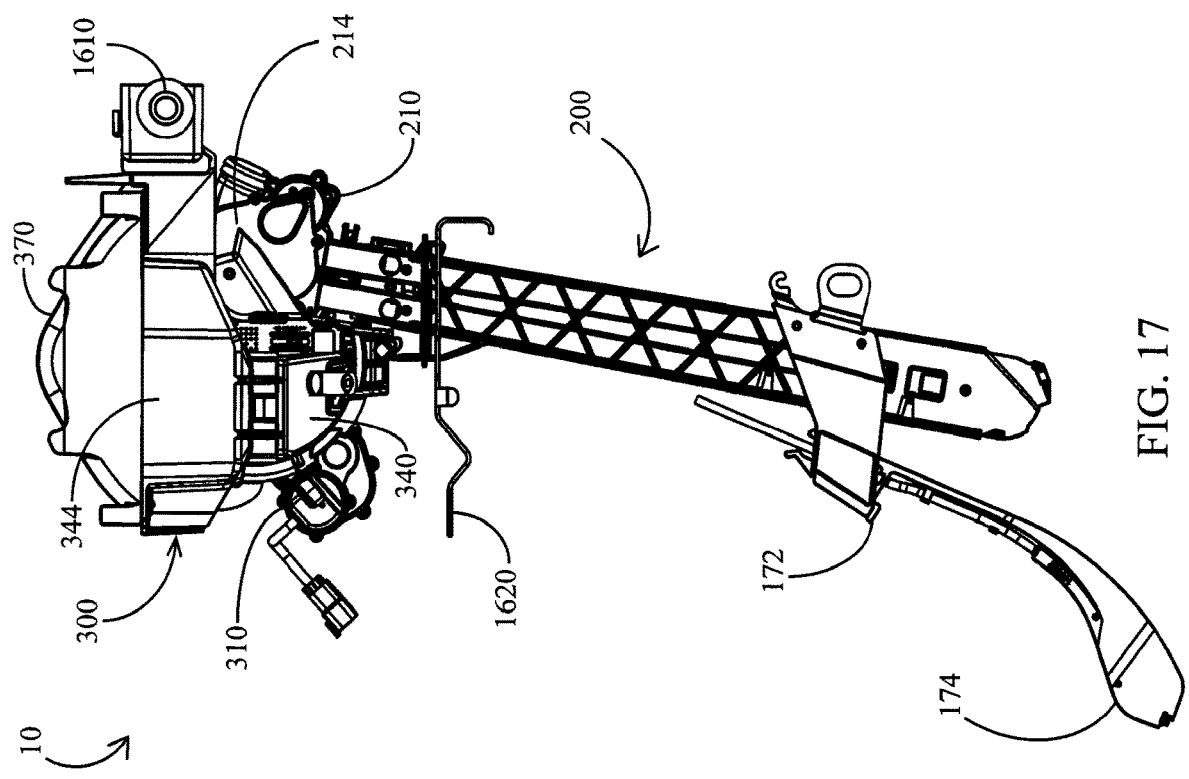
FIG. 17 is a right side elevation view of the row unit of FIG. 16.

Turning to FIGS. 14 and 15, a guide brush assembly 1400 adjacent to the seed disc 320' is illustrated. It should be appreciated that the guide brush assembly 1400 may also be used in cooperation with the single-row seed disc 320.

The guide brush assembly 1400 preferably includes an outer brush 1410 and an inner brush 1420. The brushes 1410, 1420 are preferably positioned adjacent to the seed disc 320' and above the gap between the loading wheels 410, 420. The outer brush 1410 preferably comprises a clip 1412 securing a resilient bristle set 1414. The inner brush 1420 preferably comprises a clip 1422 securing a resilient bristle set 1424. The brushes 1410, 1420 are preferably oriented such that the resilient bristle sets 1414, 1424 approach one another along the path traveled by seeds approaching the loading wheel assembly 400. The brushes 1410, 1420 thus guide seeds into the gap between the loading wheels 410, 420.

The guide brush assembly 1400 preferably further includes a side brush 1430. The side brush 1430 is preferably positioned adjacent to the seed disc 320' and above the gap between the loading wheels 410, 420. The side brush 1430 preferably comprises a clip 1432 securing a resilient bristle set 1434. The side brush 1430 is preferably oriented such that a lower end of the resilient bristle set 1434 is closer to the seed disc 320' than an upper end of the resilient bristle set 1434. As seeds entrained on apertures 324, 326 approach the loading wheel assembly 400, the side brush 1430 resiliently maintains contact between the seeds and the seed disc 320'. The side brush 1430 preferably extends between the loading wheels 410, 420.

Vent Embodiments

Figure 13:
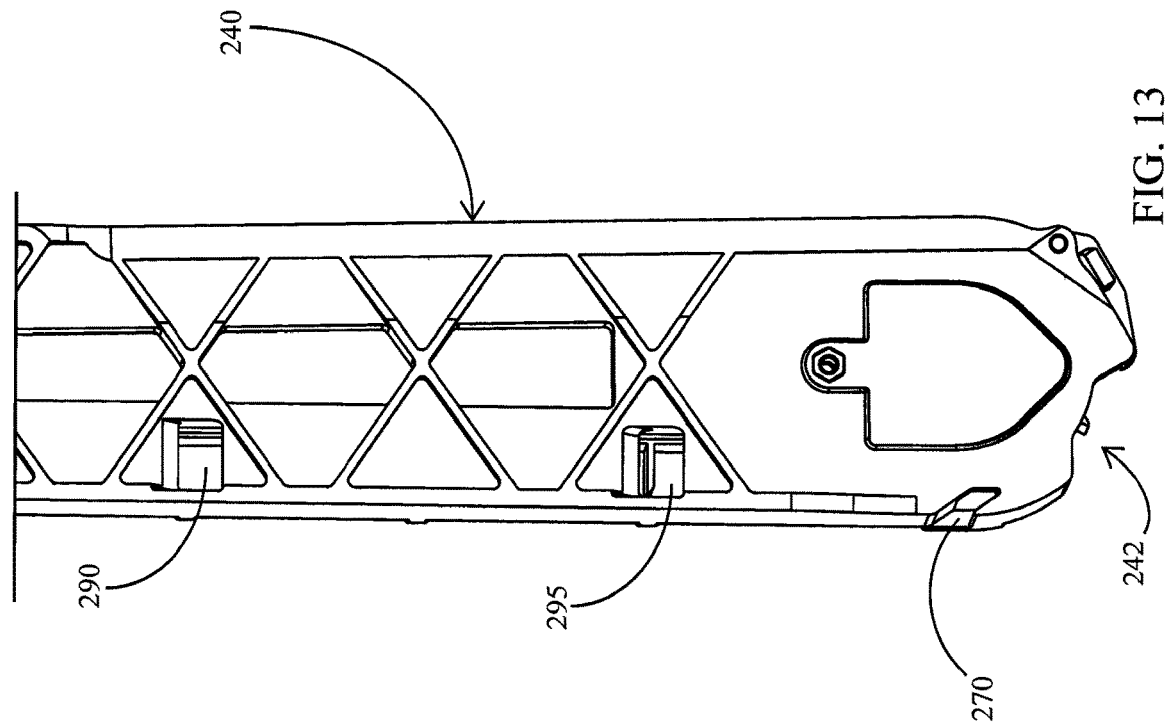
FIG. 13 is an enlarged right perspective view of a lower portion of the seed conveyor of FIG. 2.
Figure 12:
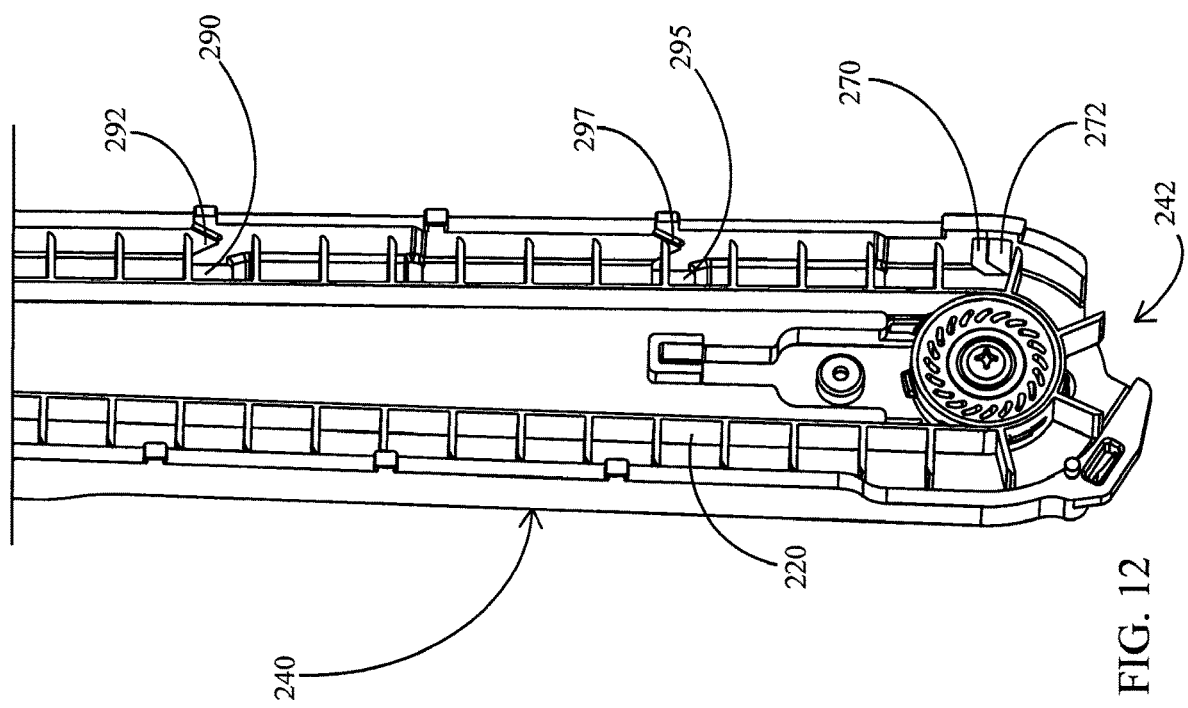
FIG. 12 is an enlarged left perspective view of a lower portion of the seed conveyor of FIG. 2.

Referring to FIGS. 12 and 13, the cover 240 preferably includes one or more vents configured to allow debris or liquid to escape the interior of the cover 240 during operation. Each vent is preferably located in a return side of the cover 240, i.e., in a side of the cover 240 adjacent to the portion of the belt 220 that is returning from the lower portion of the conveyor 200 to an upper portion of the conveyor 200. In the illustrated embodiment, the rearward side of the cover 240 (i.e., the left side as viewed along the perspective of FIG. 12) is the return side of the cover. A first vent 270 preferably comprises an opening in both a rearward and side surface of the cover 240. The first vent 270 is preferably located adjacent to the lower sprocket 250. A surface 272 preferably extends from an interior surface of the cover 240 through the vent 270 to allow debris or liquid to pass from the interior of the cover through the vent 270. A first side vent 295 is preferably formed in a side surface of the cover 240, preferably in the lower half of the cover 240. The cover 240 preferably includes a side vent (not shown) in a side surface of the cover 240 mirroring the first side vent 295. A guide 297 (e.g., a v-shaped protrusion formed a rear inner surface of the cover 240) is preferably configured to guide debris or liquid toward the side vent 295 and its mirroring side vent. A second side vent 290 is preferably formed in a side surface of the cover 240, preferably disposed above the first side vent 295. The cover 240 preferably includes a side vent (not shown) in a side surface of the cover 240 mirroring the second side vent 290. A guide 292 (e.g., a v-shaped protrusion formed a rear inner surface of the cover 240) is preferably configured to guide debris or liquid toward the side vent 290 and its mirroring side vent.

To further reduce build-up of debris or liquid within the conveyor, the interior of the cover 240 preferably has a fine surface finish and in some embodiments is coated with a hydrophobic coating (e.g., manganese oxide polystyrene or zinc oxide polystyrene nano-composite, precipitated calcium carbonate, or a silica nano-coating).

Alternative Meter-Conveyor Interface Embodiment

Figure 16:
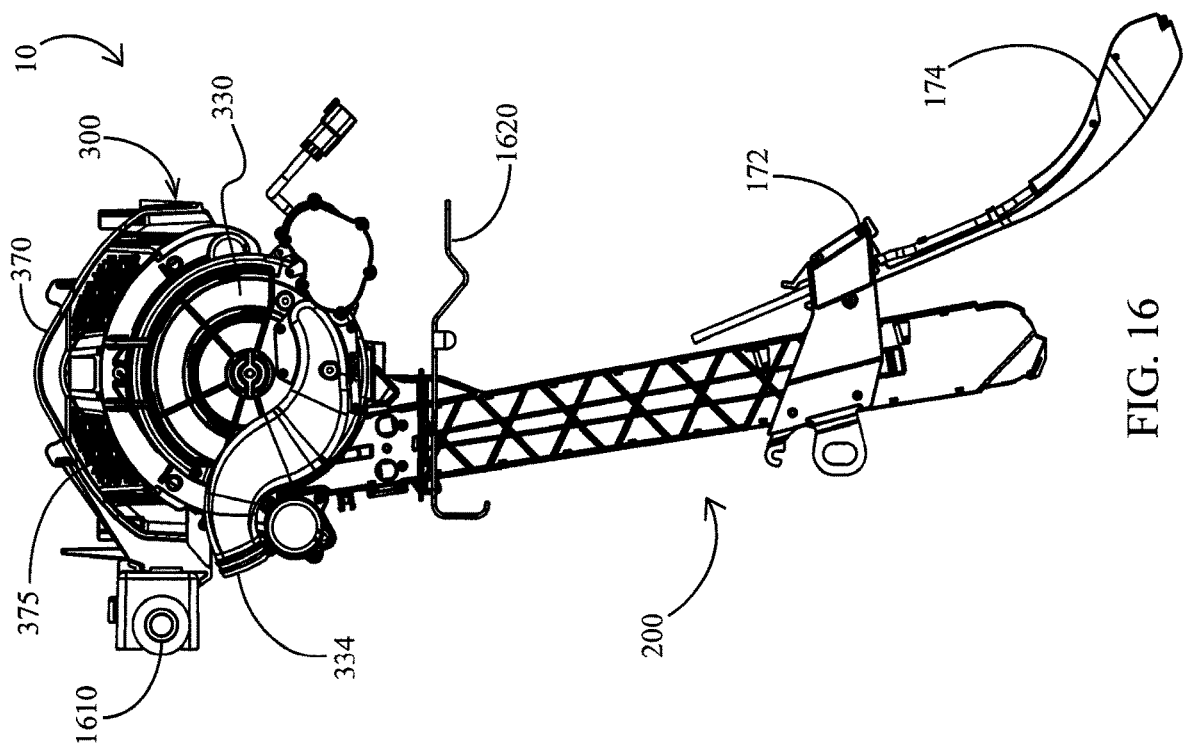
FIG. 16 is a left side elevation view of an embodiment of a row unit incorporating an embodiment of a seed conveyor and an embodiment of a seed meter.
Figure 18:
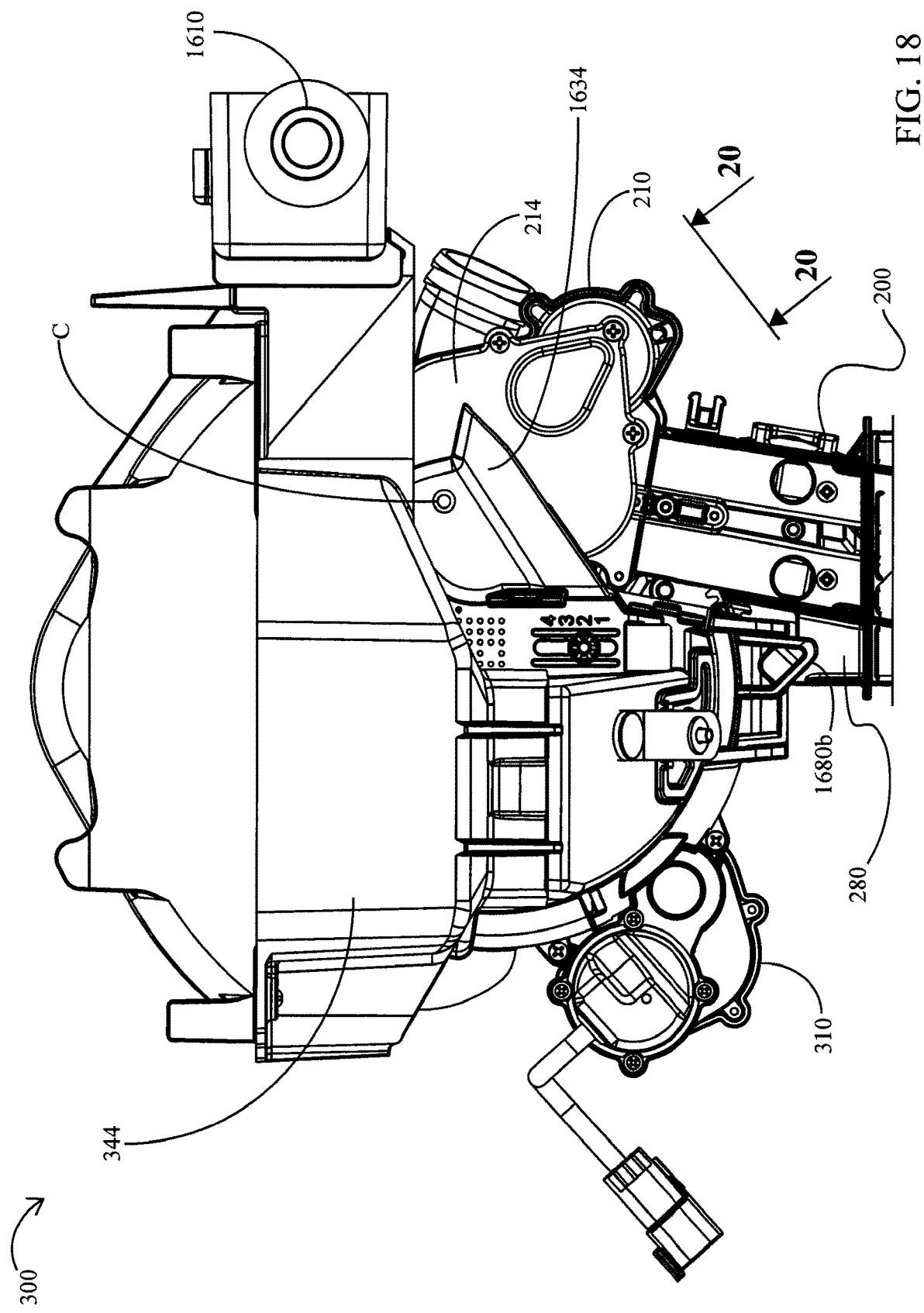
FIG. 18 is an enlarged partial right side elevation view of the row unit of FIG. 17.
Figure 19:
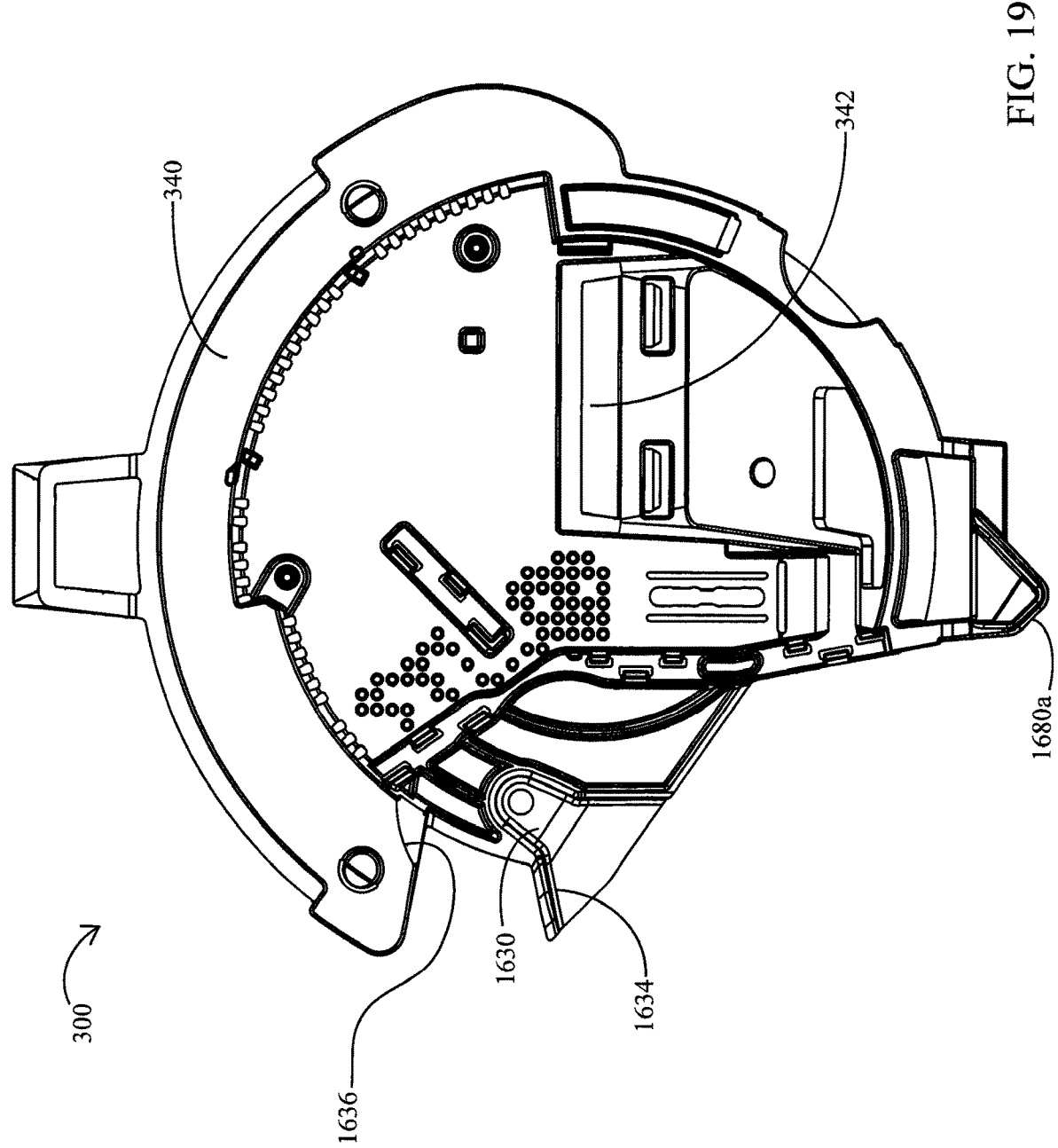
FIG. 19 is a left side elevation view of a seed side housing of the seed meter of FIG. 16.

Turning to FIGS. 16-21, a modified embodiment of the row unit 200 is illustrated. Referring first to FIG. 16, the meter 300 preferably includes a pivot bar 1610 disposed to be pivotally mounted to the row unit such that the seed meter is pivotable about the pivot bar. The conveyor 200 is preferably mounted to the shank of the row unit via a spring 1620 which biases the conveyor upward. In an installation phase, the operator preferably first mounts the conveyor 200 in the position illustrated in FIGS. 16 and 17 and then pivots the seed meter 300 downward (clockwise on the view of FIG. 16) into engagement with the conveyor 200.

Figure 20:
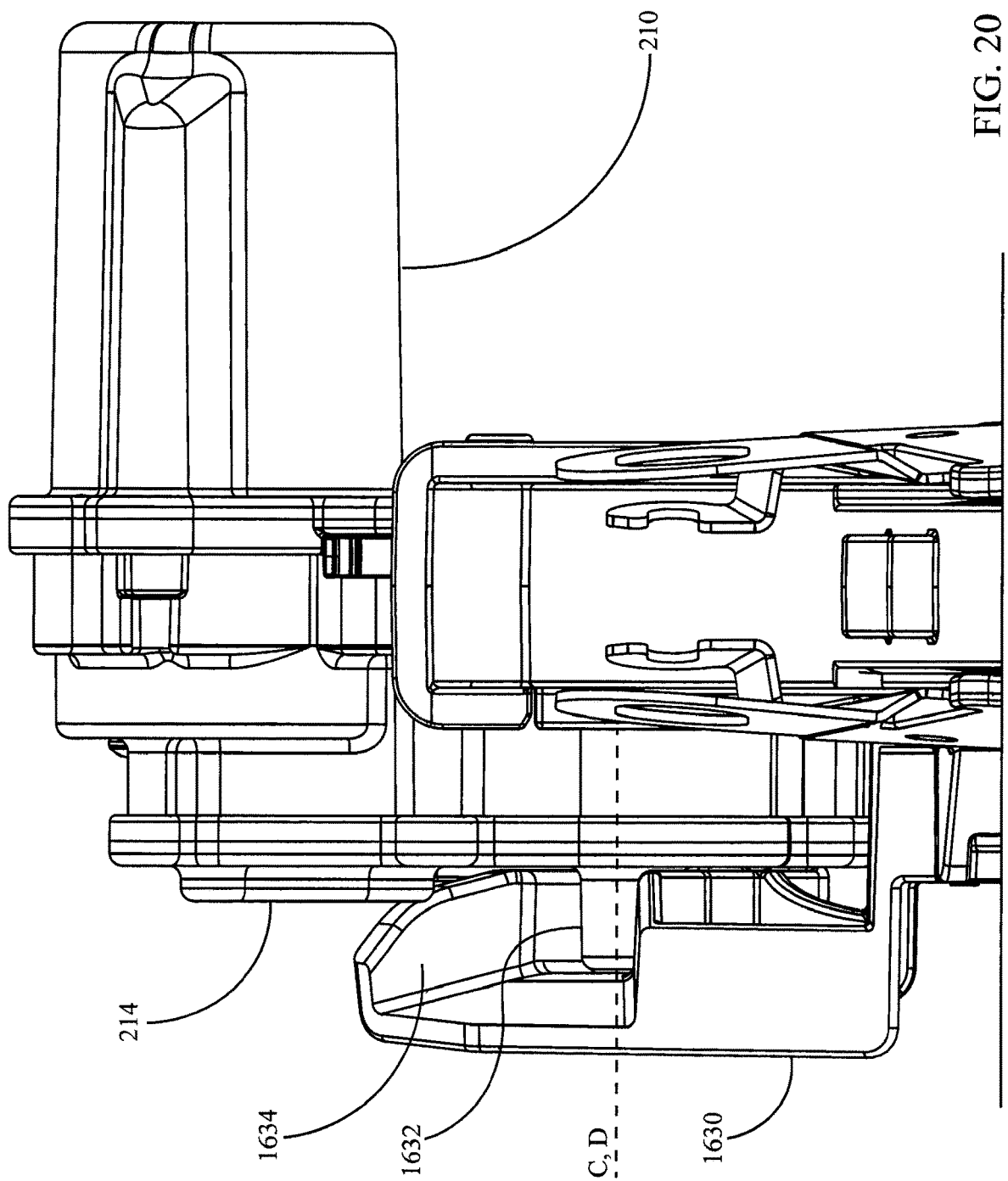
FIG. 20 is a view of a portion of the row unit as viewed along lines 20-20 of FIG. 18.
Figure 21:
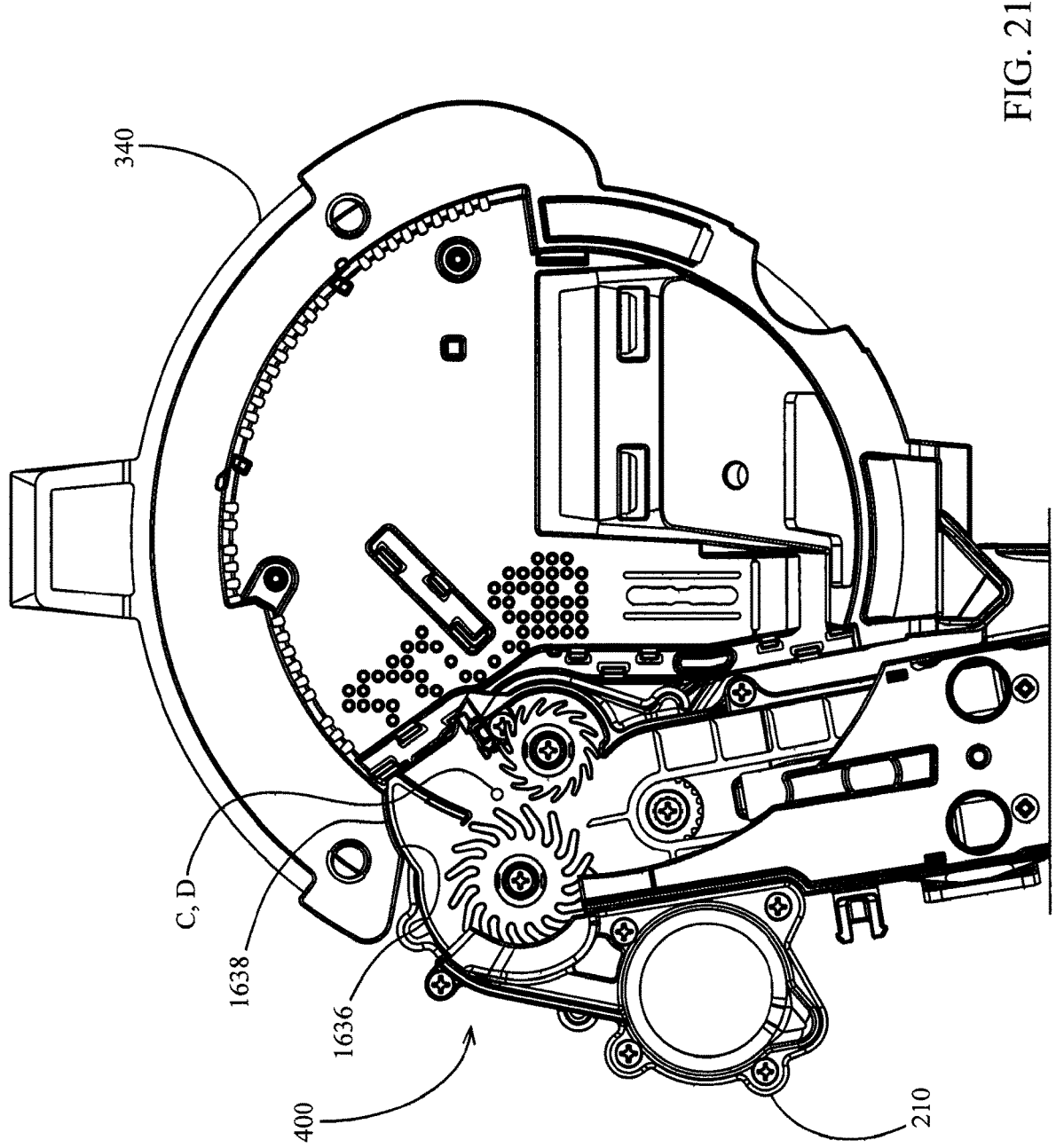
FIG. 21 is an expanded left side elevation view of the row unit of FIG. 16 with certain components removed.

Referring to FIGS. 18-21, the conveyor motor 210 preferably includes a housing 214 having a guide boss 1632. The seed meter preferably includes a seed side housing 340 having a guide pocket 1630. As the seed meter is pivoted into engagement with the conveyor, the guide boss 1632 preferably enters the guide pocket 1630 and abuts an upper inner surface of the guide pocket. The seed side housing 340 preferably includes a flange 1634 for guiding the guide boss 1632 into the guide pocket 1630. When the guide boss 1632 abuts the guide pocket 1630, the spring 1620 preferably biases the guide boss into abutment with the guide pocket, constraining the relative vertical position of the guide boss and the guide pocket. When the guide boss 1632 abuts the guide pocket 1630, a left guide clip 1680*a* and a right guide clip 1680*b* of the seed meter 300 preferably slidingly engage a guide fin 280 of the conveyor 200, constraining the relative lateral position of the conveyor and the seed meter. The seed side housing 340 preferably includes a curvilinear surface 1636 and the housing 214 preferably includes a curvilinear surface 1638; the surfaces 1636, 1638 preferably have substantially equal radii. The curvilinear surface 1636 preferably defines a central axis D such that when the meter and the conveyor are engaged, the meter and conveyor slide relative to one another about the axis D. Referring to FIG. 20, the guide boss 1632 preferably defines a central axis C. When the guide boss 1632 abuts the guide pocket 1630, the axes C, D are preferably parallel and intersecting such that the guide boss 1632 and the surface 1636 are coaxial. The surface 1638 and the guide boss 1632 are preferably coaxial. Referring to FIG. 21, the axis D is preferably located at or immediately adjacent to the location where seed meter 300 releases seeds, preferably between the loading wheels. Thus in the embodiment of FIGS. 16-21, when the seed meter 300 and the conveyor 200 are engaged, the seed meter and conveyor pivot relative to one another about a location at or immediately adjacent to the seed release point of the seed meter (e.g., the 3 o'clock position of the seed disc) and preferably between the loading wheels.

Continuing to refer to the embodiment of FIGS. 16-21, the seed meter 300 preferably includes a housing 375 having a screen vent 375. The screen vent 375 is preferably in fluid communication with an interior volume of the seed side housing 340. Thus air may be drawn through the screen vent 375 into the seed side housing 340 by vacuum imposed on a vacuum side housing 330 of the seed meter via a vacuum inlet 334. The seed side housing 340 preferably includes a seed inlet 342 in seed communication with a seed hopper 344 mounted to the seed side housing.

Seed Velocity Control

In some embodiments, the conveyor motor may drive the conveyor belt at a constant speed. In other embodiments, the conveyor belt may be driven at a speed directly related to the operational speed of the seed meter; in some such embodiments, the conveyor motor may be driven. However, as disclosed in the '327 application previously incorporated by reference herein, the conveyor motor 210 is preferably in data communication with a monitor configured to control the operating speed of the conveyor motor and thus the velocity of seeds exiting the seed conveyor into the trench. In such embodiments, described in further detail below, the conveyor belt is preferably driven at an operating speed directly related to the ground speed S of the conveyor. The ground speed S may be estimated based on the implement speed or a row-specific speed may be determined as disclosed in the '327 application. As used herein, the release velocity V of the seed refers to the velocity of the seed upon release along the travel direction of the seed upon release, at an angle θ below horizontal. The release velocity V of the seed may be determined based on the rotational speed R of the conveyor motor by the relation V=CR, where C is a constant.

In one embodiment, the conveyor belt is driven at a multiple of the conveyor ground speed, where the multiplier is determined based on the angle of release of seed from the conveyor, e.g. to match the horizontal velocity of the seed to the ground speed. As an example, if the seed is released from the conveyor at 45 degrees below horizontal, then the rotational speed R is preferably selected by the monitor using the relation:

$$R = \frac{S}{C \cos \theta}$$

In similar embodiments, a nominal rotational speed R may be determined (e.g., as described above) and a modified rotational speed $R_m$ may be commanded to the motor, where the modified rotational speed is modified by a geometric gain A and an arithmetic gain B according to the relation:

$R_m = AR + B$

The gain values A and B may be selected empirically in order to improve in-field spacing. In some embodiments an in-trench seed sensor such as that disclosed in U.S. Pat. No. 8,418,636, incorporated by reference, may be used to determine an in-trench spacing value. In some such embodiments, the gain values of A and B may be iteratively modified in order to improve the in-trench spacing. As an example, the value of B may be increased by a predetermined increment and the monitor determines whether the in-trench spacing value increases; if the in-trench spacing value increases after the value of B is increased, then the monitor preferably again increases the value of B by the predetermined increment and then again determines whether the in-trench spacing value has increased. If the in-trench spacing value stops increasing or decreases with increased values of B, then the monitor preferably stops the iterative gain modification. In some embodiments, the in-trench spacing value may be determined using the relations (e.g. the relations used to calculate the "Good Spacing Value") disclosed in U.S. Pat. No. 8,386,137, but preferably using in-trench seed sensor pulse times rather than seed tube seed sensor pulse times to determine spacing values.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An apparatus for delivering seed to a planting surface, comprising:
   a seed meter having a seed disc rotatable about a central axis in a direction of rotation, said seed disc having an array of radially spaced apertures onto which the seed is entrained, whereby as said seed disc rotates about said central axis, said array of radially spaced apertures define a seed path along which the seed is translated in said direction of rotation before the seed is released from said seed disc at a seed release location;
   a guide brush assembly disposed along said seed path before said seed release location, said guide brush assembly disposed to guide the seed to said seed release location;
   a seed conveyor disposed to receive the seed at an upper end of said seed conveyor after the seed has been released from said seed disc at said seed release location, said seed conveyor having a belt which conveys the seed from said upper end to a lower end of said seed conveyor, and wherein the conveyed seed is released from said seed conveyor with a rearward velocity relative to a forward direction of travel of said seed conveyor.

2. The apparatus of claim 1, wherein said array of apertures includes an inner aperture array and an outer aperture array, said inner aperture array defining an inner seed path and said outer aperture array defining an outer seed path, a radius from said central axis to said outer seed path being greater than a radius from said central axis to said inner seed path.

3. The apparatus of claim 2, wherein said guide brush assembly comprises an outer brush having resilient bristles and an inner brush having resilient bristles, a distal end of said resilient bristles of said outer brush extending in the direction of rotation and oriented toward said seed release location to guide the entrained seed of said outer aperture array radially inward toward said seed release location, a distal end of said resilient bristles of said inner brush extending in the direction of rotation and oriented toward said seed release location to guide the entrained seed of said inner aperture array radially outward toward said seed release location.

4. The apparatus of claim 3, further comprising:
   a first loading wheel disposed adjacent to said seed release location, said first loading wheel having an outer peripheral diameter and driven in a first rotational direction about a rotation axis disposed radially outward from said outer seed path;
   a second loading wheel disposed adjacent to said seed release location, said second loading wheel having an outer peripheral diameter and driven in a second rotational direction about a rotation axis disposed radially inward from said inner seed path, said second rotational direction of said second loading wheel being opposite said first rotational direction of said first loading wheel, whereby a distance between said outer peripheral diameters of said first and second loading wheels defines a seed gap at said seed release location;
   wherein as said entrained seed on said outer and inner seed paths rotate toward said seed gap, said entrained seed enter between said outer peripheral diameters of said first and second loading wheels, the seed being released by said first and second loading wheels into said upper end of said seed conveyor.

5. The apparatus of claim 4, wherein said first loading wheel includes a plurality of first circumferential fingers, said first circumferential fingers being oriented in a backswept orientation relative to said first rotational direction of said first loading wheel and wherein said second loading wheel includes a plurality of second circumferential fingers, said second circumferential fingers being oriented in a backswept orientation relative to said second rotational direction of said second loading wheel.

6. The apparatus of claim 4, wherein said first and second loading wheels each includes a plurality of circumferentially arranged dents.

7. The apparatus of claim 1, wherein said guide brush assembly comprises an outer brush having resilient bristles and an inner brush having resilient bristles, a distal end of said resilient bristles of said outer brush extending in the direction of rotation, a distal end of said resilient bristles of said inner brush extending in the direction of rotation, and wherein said distal ends of said outer brush and inner brush are oriented toward one another and guide the entrained seed toward said seed release location.

8. The apparatus of claim 7, wherein said guide brush assembly further comprises a side brush disposed laterally adjacent to a side surfed of said seed disc, said side brush having resilient bristles, wherein a distal end of said resilient bristles of said side brush extend in said direction of rotation and terminate proximate said side surface of said seed disc to guide the entrained seed of said array laterally toward said seed release location.

9. The apparatus of claim 8, further comprising:
a first loading wheel disposed adjacent to said seed release location, said first loading wheel having an outer peripheral diameter and driven in a first rotational direction about a rotation axis disposed radially outward from said outer seed path;
a second loading wheel disposed adjacent to said seed release location, said second loading wheel having an outer peripheral diameter and driven in a second rotational direction about a rotation axis disposed radially inward from said inner seed path, said second rotational direction of said second loading wheel being opposite said first rotational direction of said first loading wheel, whereby a distance between said outer peripheral diameters of said first and second loading wheels defines a seed gap at said seed release location;
wherein as said entrained seed on said outer and inner seed paths rotate toward said seed gap, said entrained seed enter between said outer peripheral diameters of said first and second loading wheels, the seed being released by said first and second loading wheels into said upper end of said seed conveyor.

10. The apparatus of claim 9, wherein said first loading wheel includes a plurality of first circumferential fingers, said first circumferential fingers being oriented in a backswept orientation relative to said first rotational direction of said first loading wheel and wherein said second loading wheel includes a plurality of second circumferential fingers, said second circumferential fingers being oriented in a backswept orientation relative to said second rotational direction of said second loading wheel.

11. The apparatus of claim 9, wherein said first and second loading wheels each includes a plurality of circumferentially arranged dents.

12. The apparatus of claim 7, further comprising:
a first loading wheel disposed adjacent to said seed release location, said first loading wheel having an outer peripheral diameter and driven in a first rotational direction about a rotation axis disposed radially outward from said seed path;
a second loading wheel disposed adjacent to said seed release location, said second loading wheel having an outer peripheral diameter and driven in a second rotational direction about a rotation axis disposed radially inward from said seed path, said second rotational direction of said second loading wheel being opposite said first rotational direction of said first loading wheel, whereby a distance between said outer peripheral diameters of said first and second loading wheels defines a seed gap at said seed release location;
wherein as said entrained seed on said seed path rotate toward said seed gap, said entrained seed enter between said outer peripheral diameters of said first and second loading wheels, the seed being released by said first and second loading wheels into said upper end of said seed conveyor.

13. The apparatus of claim 12, wherein said first loading wheel includes a plurality of first circumferential fingers, said first circumferential fingers being oriented in a backswept orientation relative to said first rotational direction of said first loading wheel and wherein said second loading wheel includes a plurality of second circumferential fingers, said second circumferential fingers being oriented in a backswept orientation relative to said second rotational direction of said second loading wheel.

14. The apparatus of claim 12, wherein said first and second loading wheels each includes a plurality of circumferentially arranged dents.

15. The apparatus of claim 1, further comprising:
a first loading wheel disposed adjacent to said seed release location, said first loading wheel having an outer peripheral diameter and driven in a first rotational direction about a rotation axis disposed radially outward from said seed path;
a second loading wheel disposed adjacent to said seed release location, said second loading wheel having an outer peripheral diameter and driven in a second rotational direction about a rotation axis disposed radially inward from said seed path, said second rotational direction of said second loading wheel being opposite said first rotational direction of said first loading wheel, whereby a distance between said outer peripheral diameters of said first and second loading wheels defines a seed gap at said seed release location;
wherein as said entrained seed on said seed path rotate toward said seed gap, said entrained seed enter between said outer peripheral diameters of said first and second loading wheels, the seed being released by said first and second loading wheels into said upper end of said seed conveyor.

16. The apparatus of claim 15, wherein said first loading wheel includes a plurality of first circumferential fingers, said first circumferential fingers being oriented in a backswept orientation relative to said first rotational direction of said first loading wheel and wherein said second loading wheel includes a plurality of second circumferential fingers, said second circumferential fingers being oriented in a backswept orientation relative to said second rotational direction of said second loading wheel.

17. The apparatus of claim 15, wherein said first and second loading wheels each includes a plurality of circumferentially arranged dents.

* * * * *